(12) United States Patent
Kim et al.

(10) Patent No.: US 11,969,941 B2
(45) Date of Patent: Apr. 30, 2024

(54) BINDER JETTING 3D PRINTER CAPABLE OF CONTINUOUS PRINTING

(71) Applicant: KLABS.INC, Ulsan (KR)

(72) Inventors: Won Hyo Kim, Ulsan (KR); Do Young Kim, Ulsan (KR)

(73) Assignee: KLABS.INC, Ulsan (KR)

( * ) Notice: Subject to any disclaimer, the term of this patent is extended or adjusted under 35 U.S.C. 154(b) by 0 days.

(21) Appl. No.: 17/354,975

(22) Filed: Jun. 22, 2021

(65) Prior Publication Data
US 2022/0088871 A1 Mar. 24, 2022

(30) Foreign Application Priority Data
Sep. 21, 2020 (KR) .................. 10-2020-0121808

(51) Int. Cl.
*B29C 64/25* (2017.01)
*B29C 64/176* (2017.01)
*B29C 64/232* (2017.01)
*B29C 64/236* (2017.01)
*B29C 64/295* (2017.01)
(Continued)

(52) U.S. Cl.
CPC ............ *B29C 64/25* (2017.08); *B29C 64/232* (2017.08); *B29C 64/236* (2017.08); *B29C 64/295* (2017.08); *B29C 64/35* (2017.08); *B33Y 30/00* (2014.12); *B33Y 40/00* (2014.12); *B29C 64/176* (2017.08)

(58) Field of Classification Search
CPC ..... B29C 64/25; B29C 64/245; B29C 64/214; B29C 64/218; B29C 64/259; B29C 64/165
See application file for complete search history.

(56) References Cited

U.S. PATENT DOCUMENTS

2006/0061618 A1* 3/2006 Hernandez ............ B33Y 40/00
347/29
2009/0068376 A1* 3/2009 Philippi ................. B33Y 40/00
427/532
(Continued)

FOREIGN PATENT DOCUMENTS

CN 108162385 A 6/2018
CN 109874322 A 6/2019
(Continued)

OTHER PUBLICATIONS

The Office Action for Chinese Patent Application No. 202110688057.5, dated Jun. 29, 2023.
(Continued)

*Primary Examiner* — Timothy Kennedy
*Assistant Examiner* — Ariella Machness

(57) ABSTRACT

Provided is a binder jetting 3D printer capable of continuous printing, wherein a box assembly is supplied by a horizontal movement guide means, a 3D object is built with binder jetting within a build box, and the box assembly in which the 3D object is built is withdrawn, thereby printing 3D objects continuously. In particular, provided is a binder jetting 3D printer capable of continuous printing, wherein a box assembly including a powder supply box and a build box is simplified by integrating the boxes and a lifting and lowering process of a supply plate and of a build plate is facilitated, thereby reducing the time taken for a 3D printing process and thus improving productivity.

9 Claims, 16 Drawing Sheets

(51) Int. Cl.
  *B29C 64/35*   (2017.01)
  *B33Y 30/00*   (2015.01)
  *B33Y 40/00*   (2020.01)

(56) References Cited

U.S. PATENT DOCUMENTS

| | | | |
|---|---|---|---|
| 2011/0300248 | A1 | 12/2011 | Tung et al. |
| 2013/0004607 | A1* | 1/2013 | Hoechsmann ........ B29C 64/232 |
| | | | 425/112 |
| 2019/0344500 | A1* | 11/2019 | Côté ..................... B29C 64/182 |
| 2021/0187854 | A1* | 6/2021 | Peng .................... B29C 64/236 |
| 2021/0206071 | A1* | 7/2021 | Regnier ................ B29C 64/245 |

FOREIGN PATENT DOCUMENTS

| | | | |
|---|---|---|---|
| CN | 111531878 A | 8/2020 | |
| KR | 10-2009-0074492 A | 7/2009 | |
| KR | 10-1273794 B1 | 6/2013 | |
| KR | 10-1646773 B1 | 8/2016 | |
| KR | 10-1872211 B1 | 6/2018 | |
| KR | 10-2078813 B1 | 2/2020 | |
| KR | 102078813 B1 * | 2/2020 | |
| KR | 10-2083788 B1 | 3/2020 | |
| KR | 10-2100351 B1 | 4/2020 | |
| WO | WO-2015091941 A1 * | 6/2015 | ............ B22F 3/1055 |
| WO | 2019/022729 A1 | 1/2019 | |
| WO | 2019/228281 A1 | 12/2019 | |
| WO | WO-2020232500 A1 * | 11/2020 | |

OTHER PUBLICATIONS

The Notice of Allowance for Chinese Patent Application No. 202110688057.5, dated Feb. 1, 2024.

\* cited by examiner

BINDER JETTING 3D PRINTER CAPABLE OF CONTINUOUS PRINTING

CROSS REFERENCE TO RELATED APPLICATION

The present application claims priority to Korean Patent Application No. 10-2020-0121808, filed Sep. 21, 2020, the entire contents of which is incorporated herein for all purposes by this reference.

BACKGROUND OF THE INVENTION

Field of the Invention

The present disclosure relates to a binder jetting 3D printer capable of continuous printing, wherein a box assembly is supplied by a horizontal movement guide means, a 3D object is built with binder jetting within a build box, and the box assembly in which the 3D object is built is withdrawn, thereby printing 3D objects continuously.

Description of the Related Art

A 3D printing technology is a manufacturing technology that creates an object on the basis of a 3D drawing in a manner similar to printing in a 3D space.

3D printing technology was used only for very limited uses because of a high price of 3D printers. However, recently, 3D printers with reduced price have been popularized, and have been applied to all industrial fields because the materials are not limited to plastic materials and have been expanded in scope to include nylon and metal, for example.

3D printing methods include the following: stereolithography apparatus (SLA) using the principle that a laser is projected into a photocurable resin and the part subjected to exposure to the laser is solidified; selective laser sintering (SLS) using the principle that sintering is performed by projecting a laser beam and using a functional polymer or metal powder instead of a photocurable resin in SLA; laminated object manufacturing (LOM) in which adhesive-coated paper is cut into a desired section with a laser beam and laminated layer by layer; ballistic particle manufacturing (BPM) using an ink jet printer technique; and binder jetting in which powder is applied on a build plate, and binder is sprayed to a desired region of the powder on the build plate to make the powder adhere using the binder, whereby an object is created through laminating layer by layer.

As a binder jetting 3D printer for building an object using binder and powder, the one disclosed in Korean Patent No. 10-1872210 (hereinafter, referred to as "Patent Document 1") is known.

In the case of Patent Document 1, the configuration of a build box, a powder supply box, a powder withdrawal box, a build plate, and an actuator is very complicated, so a 3D printing process takes a long time and the productivity is low.

The foregoing is intended merely to aid in the understanding of the background of the present disclosure, and is not intended to mean that the present disclosure falls within the purview of the related art that is already known to those skilled in the art.

Document of Related Art (Patent Document 1) Korean Patent No. 10-1872210.

SUMMARY OF THE INVENTION

Accordingly, the present disclosure has been made keeping in mind the above problems occurring in the related art, and the present disclosure is directed to providing a binder jetting 3D printer capable of continuous printing, wherein a box assembly including a powder supply box and a build box is simplified by integrating the boxes and a lifting and lowering process of a supply plate and of a build plate is facilitated, thereby reducing the time taken for a 3D printing process and thus improving productivity.

According to an embodiment of the present disclosure, there is provided a binder jetting 3D printer capable of continuous printing, the binder jetting 3D printer including: a main frame provided with a binder nozzle and a powder leveling means, and provided with a building region, a powder supply region, and a withdrawal region; a box assembly provided with a build box in which a build plate is provided and with a powder supply box in which a supply plate is provided, the build box and the powder supply box being integrated with each other; a build plate lifting and lowering means lifting and lowering the build plate; a supply plate lifting and lowering means lifting and lowering the supply plate; and a horizontal movement guide means guiding horizontal movement of the box assembly.

In addition, the build plate and the build plate lifting and lowering means, or the supply plate and the supply plate lifting and lowering means may be aligned by an alignment pin provided at a first side and an alignment hole provided at a second side.

In addition, the build plate and the build plate lifting and lowering means, or the supply plate and the supply plate lifting and lowering means may be coupled to each other by magnetic force.

In addition, the binder jetting 3D printer may further include a nozzle head lifting and lowering means lifting and lowering a nozzle head of the binder nozzle.

In addition, a plurality of the withdrawal regions may be provided and may communicate with each other.

In addition, the binder jetting 3D printer may further include a cleaning means.

In addition, the cleaning means may include at least one of the following: a cleaning liquid spray nozzle for spraying a cleaning liquid to a lower surface of a nozzle head of the binder nozzle; a brush for brushing the lower surface of the nozzle head; and an air nozzle for spraying air to the lower surface of the nozzle head.

In addition, the binder nozzle may have a side on which a sealing material is provided, and the main frame may be provided with a cleaning region open, wherein the binder nozzle may be lowered toward the cleaning region, and while the sealing material is in contact with an upper part of the cleaning region, the binder nozzle may be cleaned.

In addition, the binder jetting 3D printer may further include a heating means with which the powder leveling means is provided.

In addition, the binder jetting 3D printer may further include a box assembly lifting and lowering means lifting and lowering the horizontal movement guide means so that the box assembly is lifted and lowered.

According to the binder jetting 3D printer capable of continuous printing according to the present disclosure as described above, there are the following effects.

Through the box assembly including the powder supply box and the build box integrated with each other, the horizontal movement guide means, the build plate lifting and lowering means, and the supply plate lifting and lowering means, a 3D printing process can be continuously performed and objects can be continuously printed.

Since the withdrawal box is provided surrounding the build box, the main frame can be prevented from becoming dirty because of dispersion of surplus powder over the main frame. Accordingly, powder is prevented from scattering, so that a work environment in performing a 3D printing process can be improved.

The first lifting and lowering plate and the build plate are coupled to each other and the second lifting and lowering plate and the supply plate are coupled to each other by magnetic force, so that the build plate and the supply plate can be smoothly lifted and lowered by the lifting and lowering of the first lifting and lowering plate and the second lifting and lowering plate, respectively.

The leveling plate is heated by the heating means, so that the powder can be warmed. Therefore, the binder is made to harden more quickly, thus shortening the time taken for a 3D printing process.

By lifting and lowering the horizontal movement guide means, the smooth horizontal movement of the box assembly and the prevention of powder leakage to the gap between the main frame and the box assembly can be achieved simultaneously.

When the box assembly is horizontally moved, the box assembly can be easily placed in position and damage to the box assembly can be effectively prevented through the stopper.

Since the cleaning region is separated from the building region and the powder supply region, the flow of foreign matter occurring in a cleaning process into the building region and the powder supply region can be effectively prevented, thus improving the reliability of a 3D printing process.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, the following merely illustrates the principles of the disclosure. Therefore, those skilled in the art will be able to devise various devices which, although not explicitly described or illustrated herein, embody the principles of the disclosure and fall within the concept and scope of the disclosure. It is also to be understood that all conditional terms and embodiments described in this specification are, in principle, intended only for the purpose of enabling the inventive concept to be understood, and are not intended to limit the scope of the disclosure to such specifically recited embodiments and conditions.

The foregoing and other objectives, features, and advantages of the present disclosure will become more apparent from the following detailed description of the present disclosure when taken in conjunction with the accompanying drawings. Accordingly, those skilled in the art will readily understand the technical idea of the present disclosure from the detailed description.

The embodiments described herein will be described with reference to cross-sectional views and/or perspective views that are ideal illustrations of the present disclosure. Accordingly, embodiments of the present disclosure are not limited to specific forms that are illustrated, but they change in the shapes according to manufacturing process.

Hereinafter, a binder jetting 3D printer 10 capable of continuous printing according to the present disclosure will be described with reference to FIGS. 1 to 9D.

Figure 1:
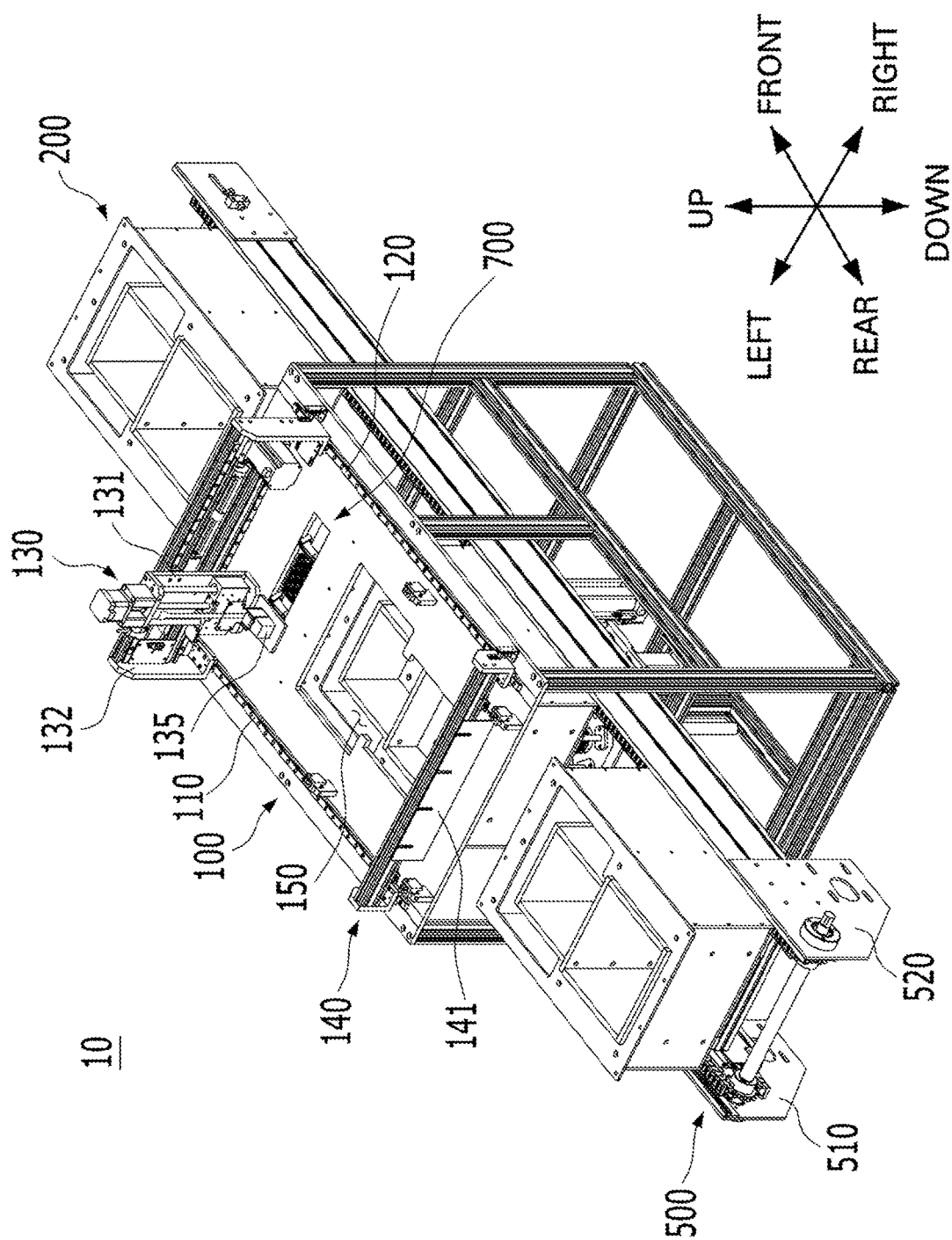
FIG. 1 is a perspective view of a binder jetting 3D printer of the present disclosure.
Figure 2:
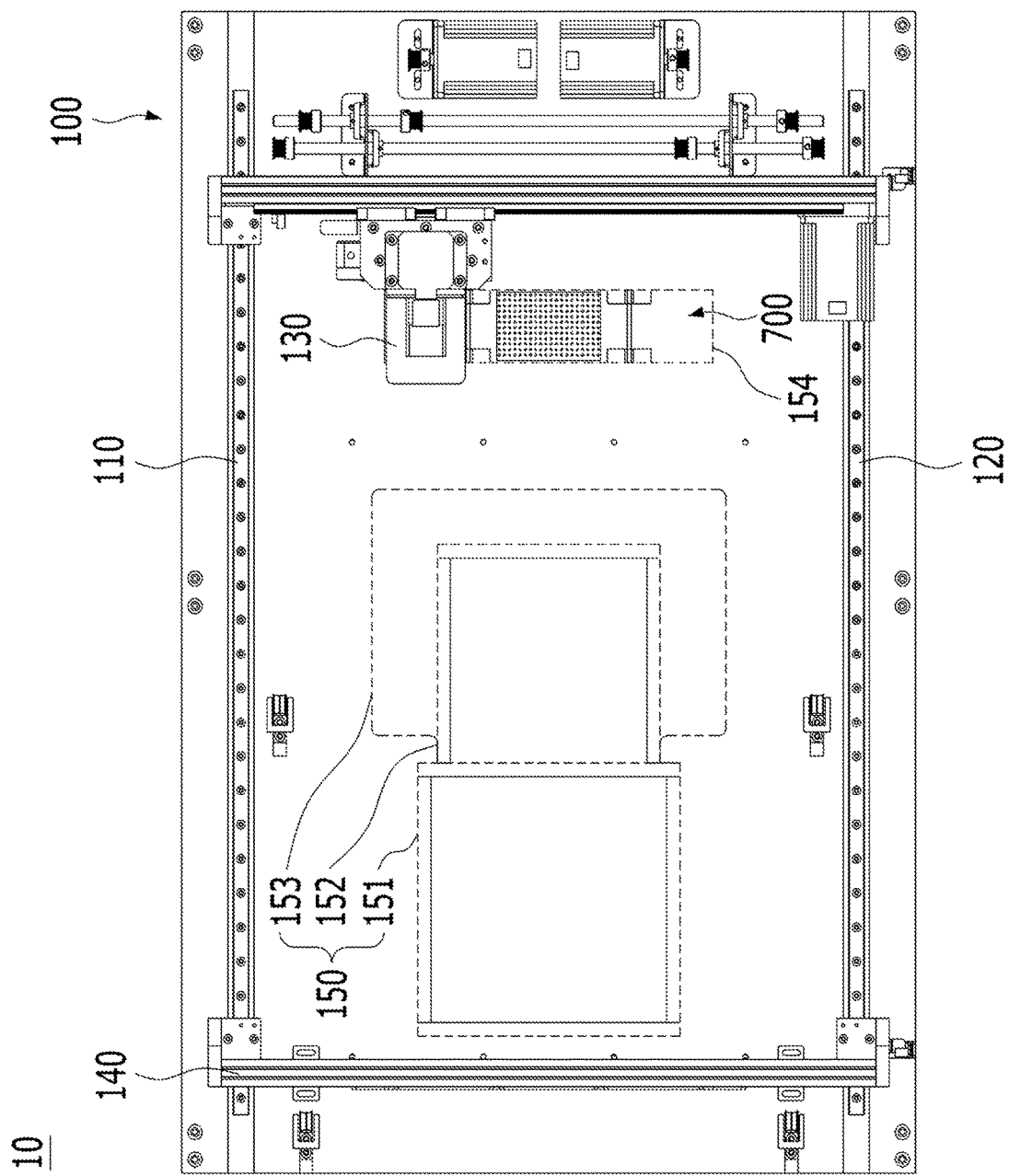
FIG. 2 is a plan view of a binder jetting 3D printer of the present disclosure.
Figure 3:
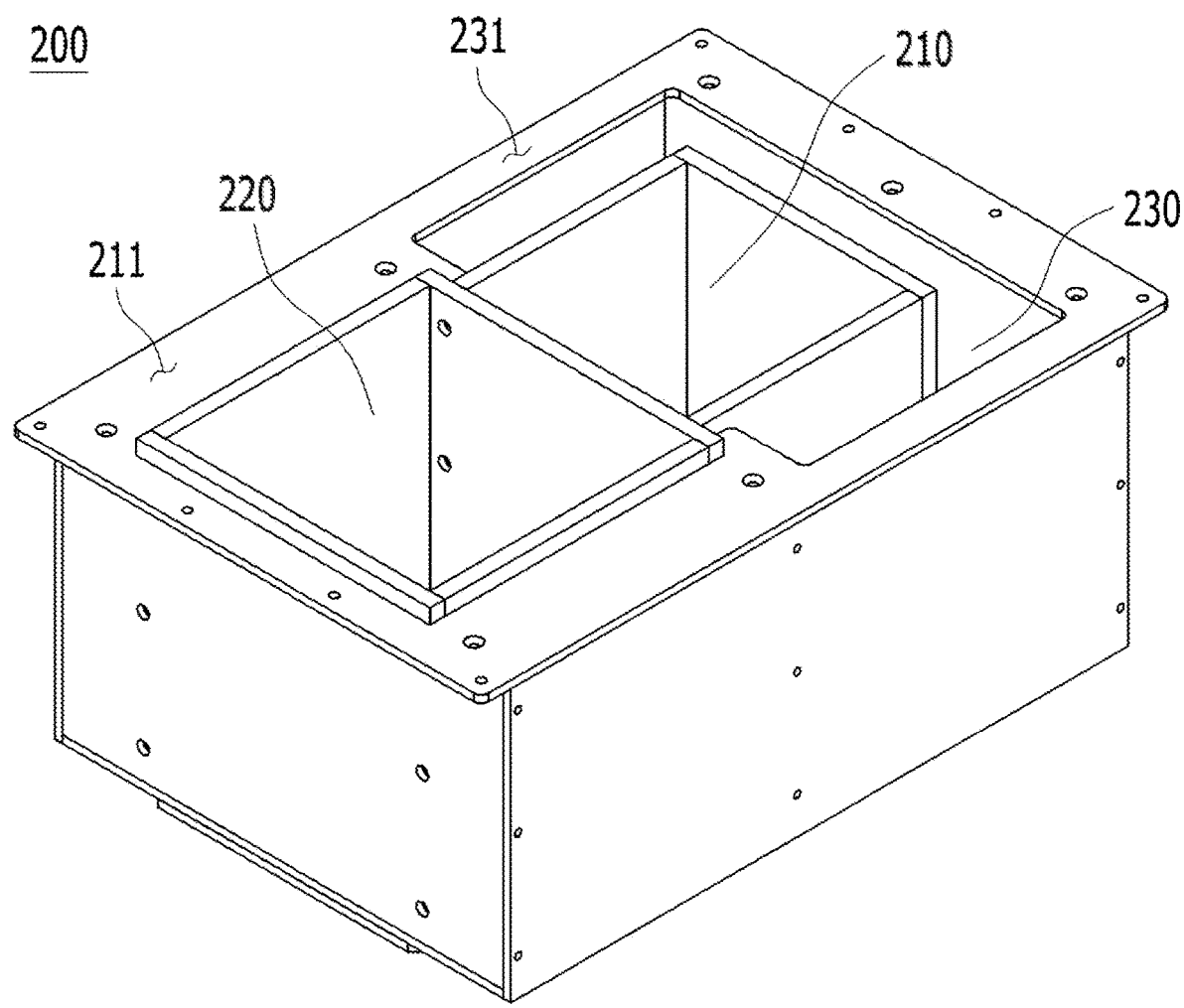
FIG. 3 is a perspective view of a box assembly of FIG. 1.
Figure 4A:
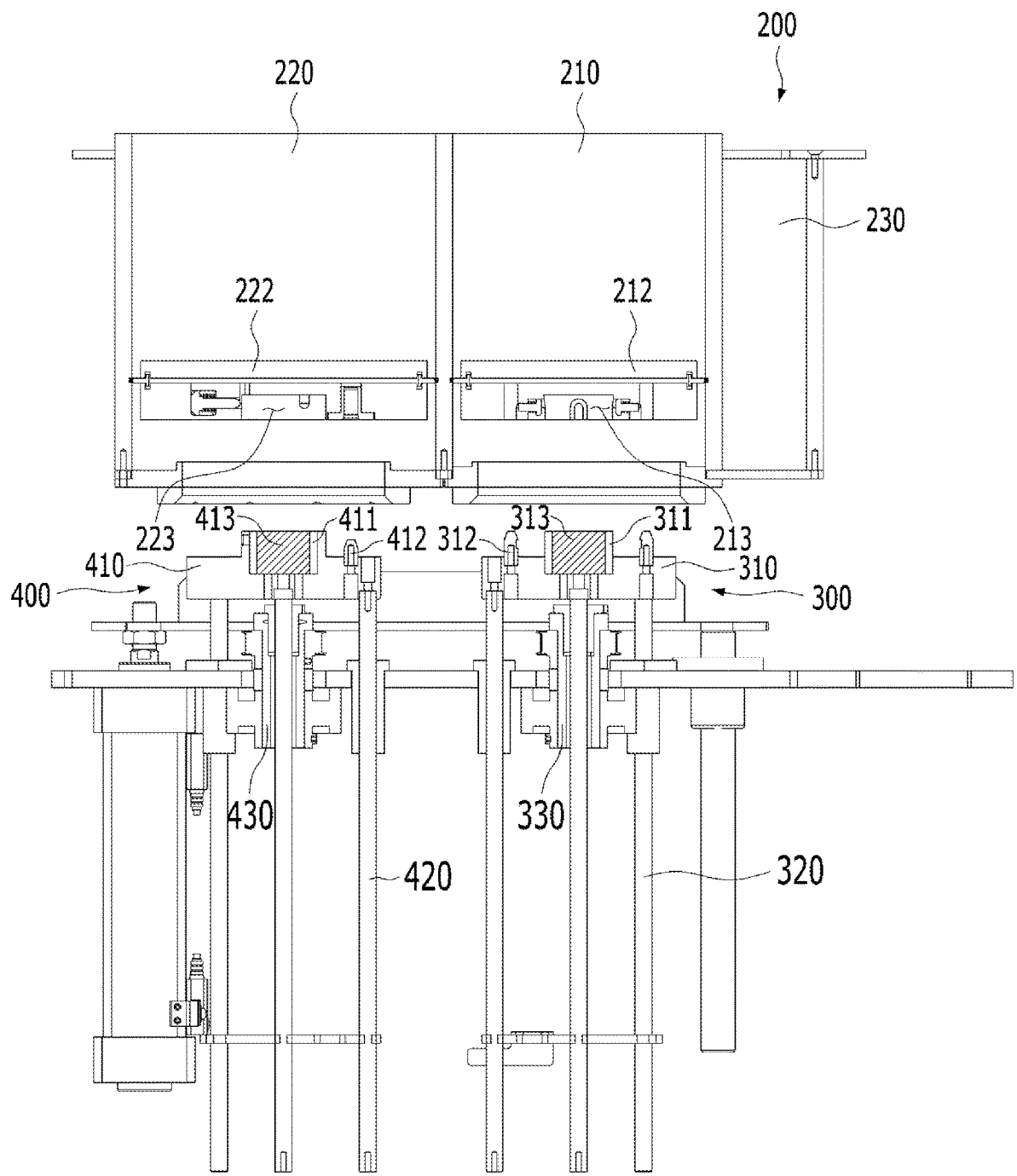
FIGS. 4A to 4C are cross-sectional views illustrating a case in which a build plate and a supply plate are lifted and lowered by a build plate lifting and lowering means and a supply plate lifting and lowering means of a binder jetting 3D printer of the present disclosure.
Figure 4B:
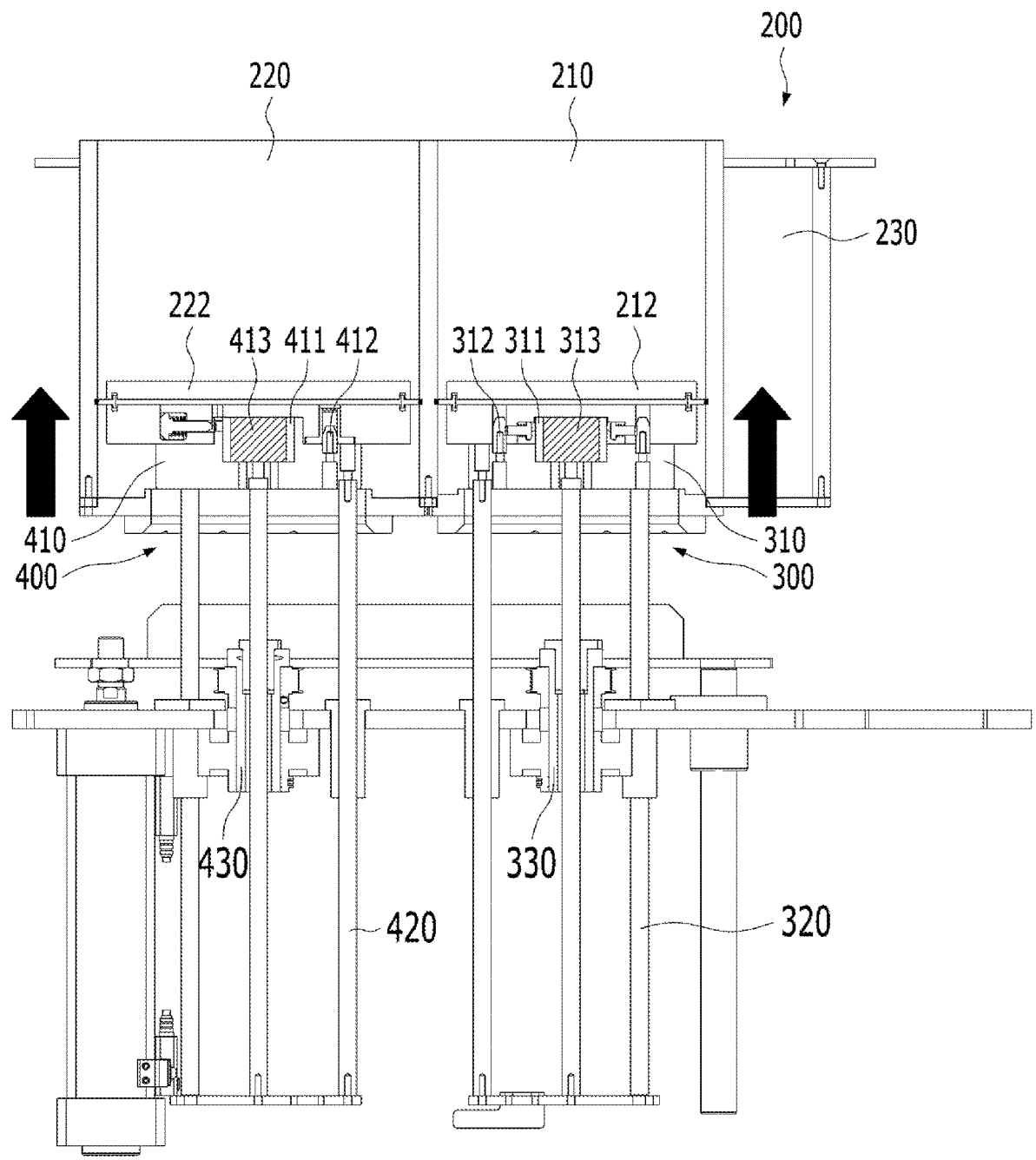
Figure 4C:
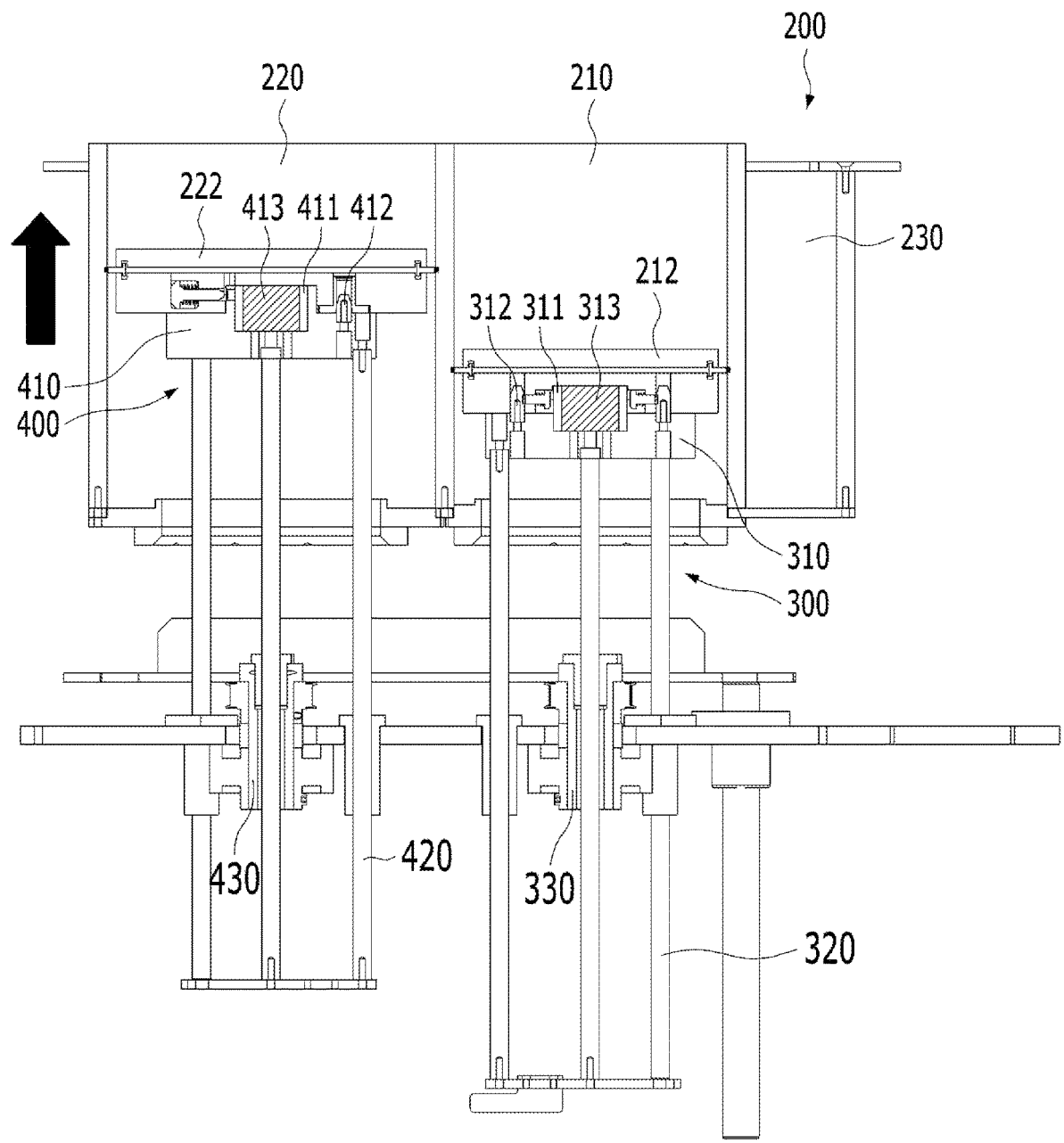
Figure 5:
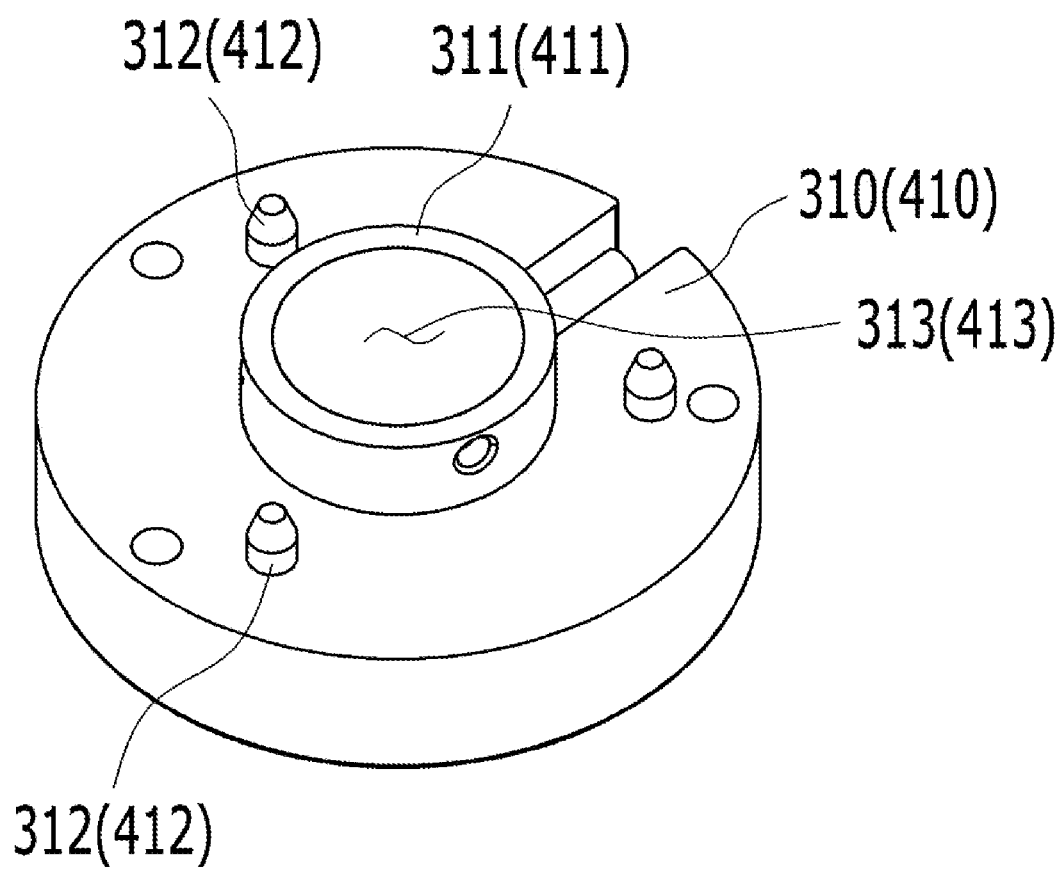
FIG. 5 is a perspective view of a first lifting and lowering plate (or a second lifting and lowering plate) of FIG. 4A.
Figure 6:
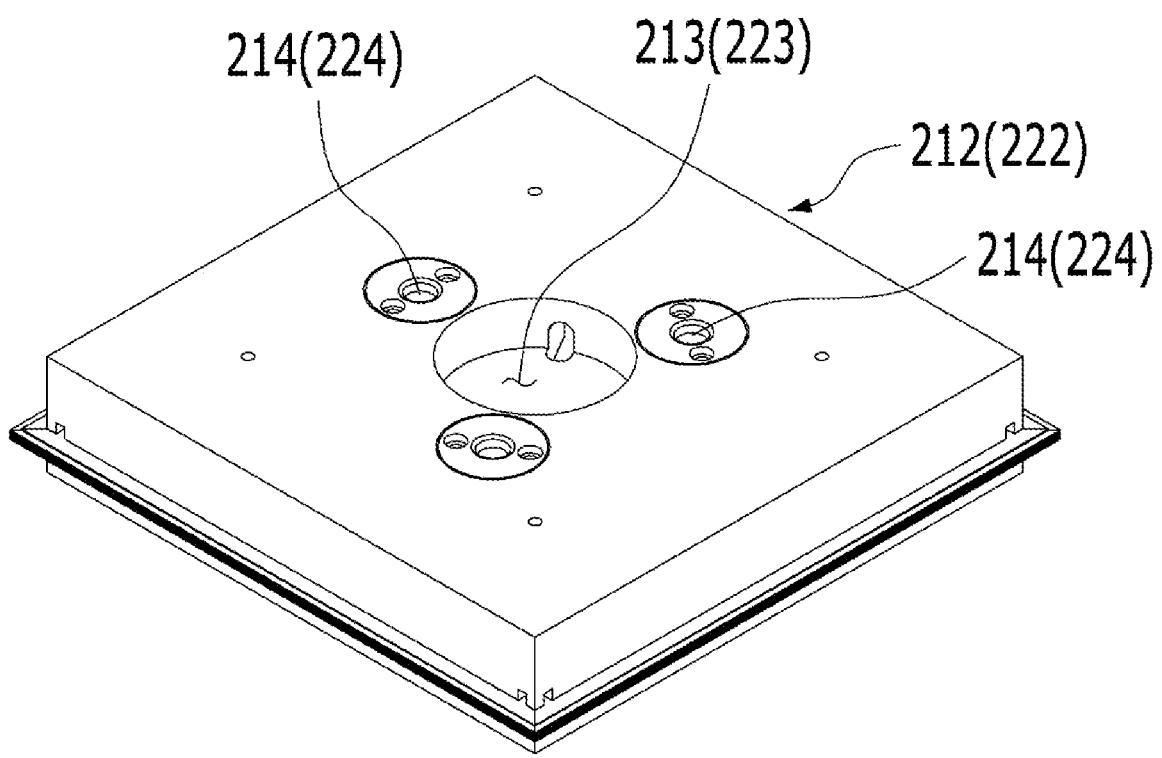
FIG. 6 is a perspective view of a lower surface of a build plate (or a supply plate) of FIG. 4A.
Figure 7A:
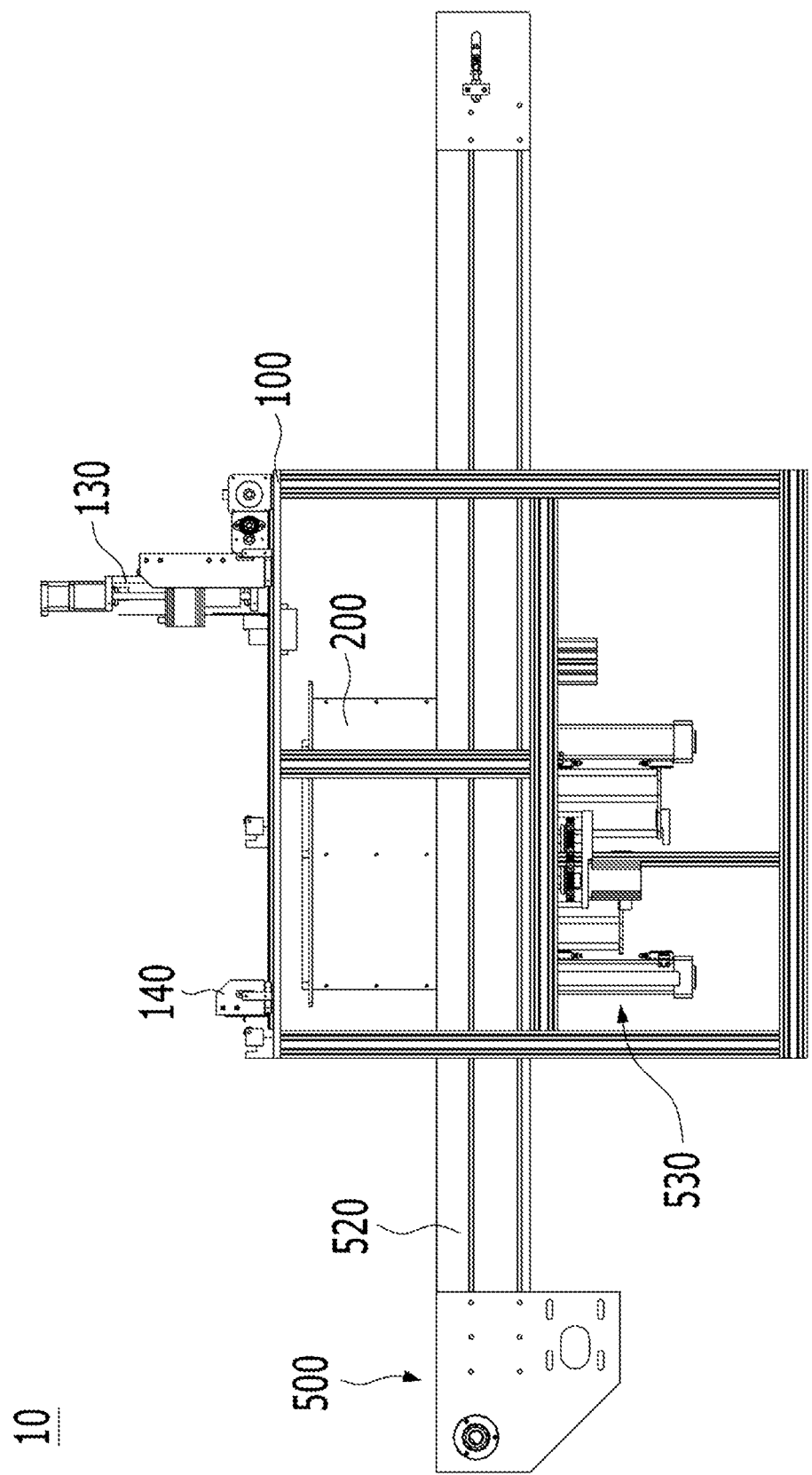
FIGS. 7A and 7B are side views illustrating a case in which a box assembly is lifted by a box assembly lifting and lowering means of a binder jetting 3D printer of the present disclosure.
Figure 7B:
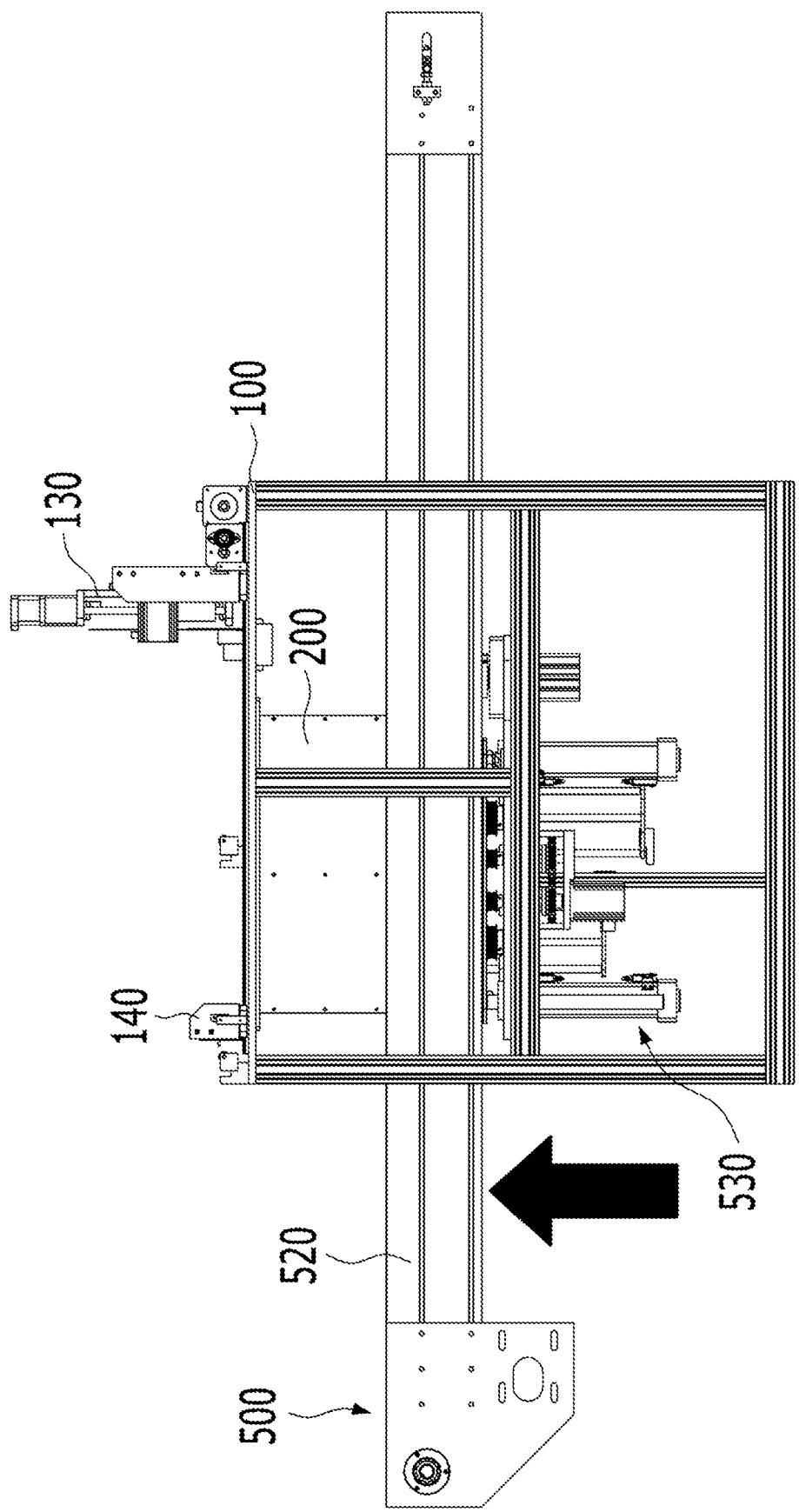
Figure 8A:
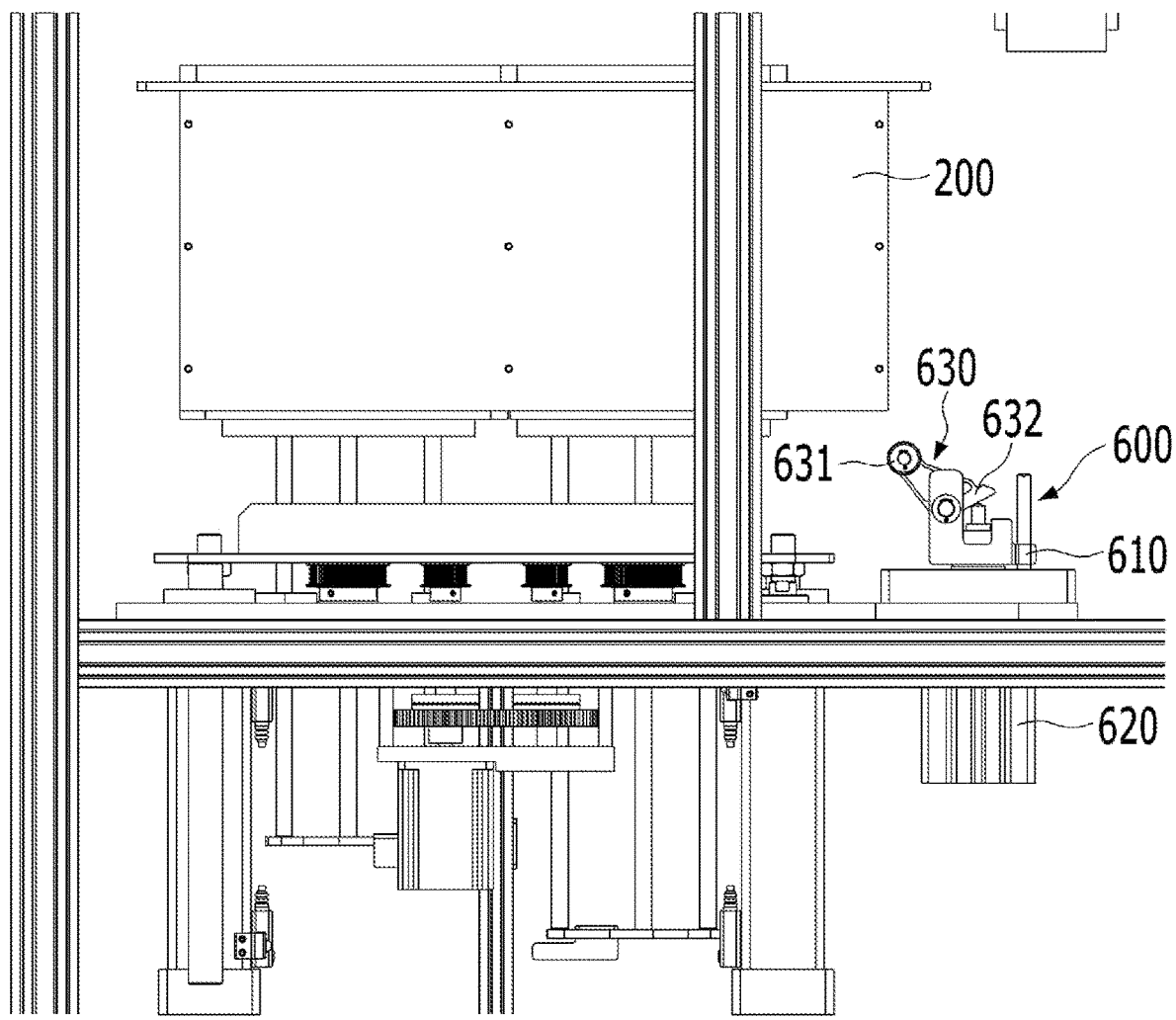
FIGS. 8A and 8B are views illustrating the operation of a stopper for aligning a box assembly of a binder jetting 3D printer of the present disclosure when the box assembly is positioned at a working position.
Figure 8B:
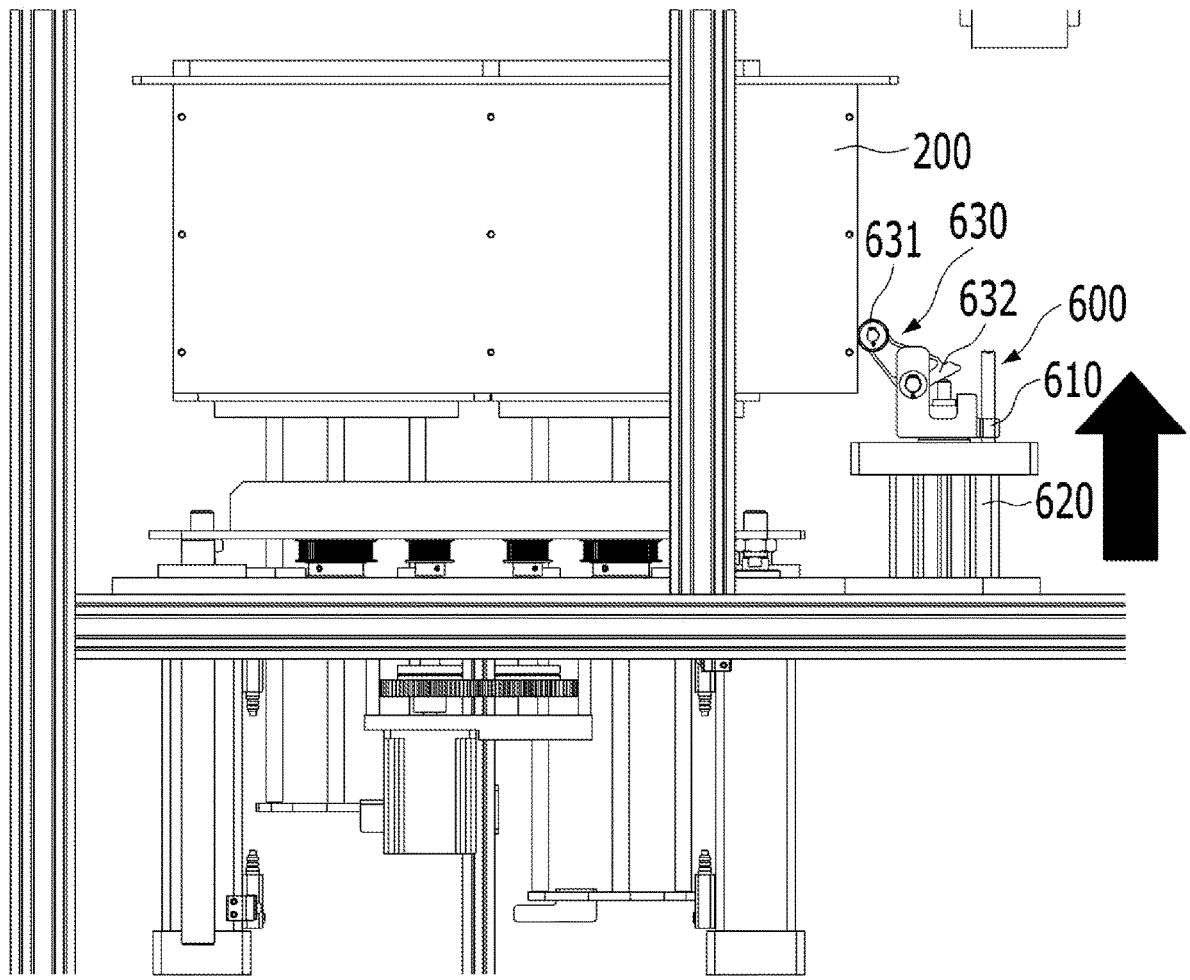

FIG. 1 is a perspective view of a binder jetting 3D printer of the present disclosure. FIG. 2 is a plan view of a binder jetting 3D printer of the present disclosure. FIG. 3 is a perspective view of a box assembly of FIG. 1. FIGS. 4A to 4C are cross-sectional views illustrating a case in which a build plate and a supply plate are lifted and lowered by a build plate lifting and lowering means and a supply plate lifting and lowering means of a binder jetting 3D printer of the present disclosure. FIG. 5 is a perspective view of a first lifting and lowering plate (or a second lifting and lowering plate) of FIG. 4A. FIG. 6 is a perspective view of a lower surface of a build plate (or a supply plate) of FIG. 4A. FIGS. 7A and 7B are side views illustrating a case in which a box assembly is lifted by a box assembly lifting and lowering means of a binder jetting 3D printer of the present disclosure. FIGS. 8A and 8B are views illustrating the operation of a stopper for aligning a box assembly of a binder jetting 3D printer of the present disclosure when the box assembly is positioned at a working position. FIGS. 9A to 9D are perspective views illustrating a process of cleaning a binder nozzle through a cleaning means of a binder jetting 3D printer of the present disclosure.

Regarding the binder jetting 3D printer 10 of the present disclosure, as shown in FIG. 1, a box assembly 200 is moved for supply from the rear of the binder jetting 3D printer 10 to the front thereof by a horizontal movement guide means 500, a 3D printing process is performed, and a 3D object built by the 3D printing process is moved forward with the box assembly 200. As described above, the binder jetting 3D printer 10 of the present disclosure is the binder jetting 3D printer 10 capable of continuous printing, the binder jetting 3D printer being capable of building 3D objects continuously through movement of multiple box assemblies 200.

As shown in FIGS. 1 to 9D, the binder jetting 3D printer 10 capable of continuous printing according to the present disclosure may include: a main frame 100 provided with a binder nozzle 130 and a powder leveling means 140, and provided with a building region 151, a powder supply region 152, and a withdrawal region 153; a box assembly 200 provided with a build box 210 in which a build plate 212 is provided and with a powder supply box 220 in which a supply plate 222 is provided, the build box 210 and the powder supply box 220 being integrated with each other; a build plate lifting and lowering means 300 lifting and lowering the build plate 212; a supply plate lifting and lowering means 400 lifting and lowering the supply plate 222; a horizontal movement guide means 500 guiding horizontal movement of the box assembly 200; a nozzle head lifting and lowering means 136 lifting and lowering the binder nozzle 130; a cleaning unit 700 including a cleaning means cleaning the binder nozzle 130; a heating means (not shown) with which the powder leveling means 140 is provided; a box assembly lifting and lowering means 530 lifting and lowering the horizontal movement guide means 500 so that the box assembly 200 is lifted and lowered; and a stopper 600 placing the box assembly 200 in position.

The Main Frame 100, the Binder Nozzle 130, and the Powder Leveling Means 140

Hereinafter, the main frame 100, the binder nozzle 130, and the powder leveling means 140 of the binder jetting 3D printer 10 of the present disclosure will be described with reference to FIGS. 1 to 4C.

As shown in FIGS. 1 and 2, a first rail 110 formed in a forward-backward direction is provided on the left side of the main frame 100, and a second rail 120 formed in a forward-backward direction is provided on the right side of the main frame 100.

At the rear of the main frame 100, the binder nozzle 130 is provided.

As shown in FIGS. 1, 2, and 9A to 9D, the binder nozzle 130 may include: a nozzle moving means 132 provided on the first rail 110 and the second rail 120 so that a nozzle body 131 of the binder nozzle 130 is movable in a forward-backward direction; a first nozzle guide 133 with which the nozzle moving means 132 is provided so that the nozzle body 131 is movable in a left-right direction; and the nozzle head lifting and lowering means 136 of lifting and lowering the nozzle head 135 along a second nozzle guide 134 with which the nozzle body 131 is provided.

The nozzle moving means 132 is provided on the first and the second rail 110 and 120.

The nozzle moving means 132 is movable in a forward-backward direction along the first and the second rail 110 and 120.

The nozzle body 131 is provided at the first nozzle guide 133 of the nozzle moving means 132 in such a manner as to be movable in a left-right direction.

The nozzle head lifting and lowering means 136 lifts and lowers the nozzle head 135.

The lifting and lowering of the nozzle head 135 is achieved along the second nozzle guide 134 of the nozzle body 131.

The nozzle head 135 is for jetting binder.

The nozzle head 135 is vertically movable in an upward-downward direction, namely, a Z-axis direction, by the nozzle head lifting and lowering means 136.

The nozzle body 131 is horizontally movable in a left-right direction, namely, an X-axis direction, by the first nozzle guide 133.

The nozzle body 131 is horizontally movable in a forward-backward direction, namely, a Y-axis direction, by the nozzle moving means 132.

According to the above configuration, the nozzle head 135 is freely movable in a forward-backward direction, a left-right direction, and an upward-downward direction, that is, an X-axis direction, a Y-axis direction, and a Z-axis direction. Therefore, according to the control of a control unit (not shown), through the nozzle head 135 of the binder nozzle 130, binder may be selectively jetted to the powder on the build plate 212.

At the front of the main frame 100, the powder leveling means 140 is provided.

The powder leveling means 140 is provided on the first and the second rail 110 and 120.

The powder leveling means 140 is movable in a forward-backward direction, namely, a Y-axis direction, along the first and the second rail 110 and 120.

The powder leveling means 140 is provided with a leveling plate 141.

When the powder leveling means 140 moves in a forward-backward direction, namely, a Y-axis direction, along the first and the second rail 110 and 120, the leveling plate 141 supplies the powder on the supply plate 222 onto the build plate 212 through a lower surface of the leveling plate 141 and simultaneously, levels the powder supplied on to the build plate 212.

The powder leveling means 140 is provided with a heating means (not shown).

The heating means heats the leveling plate 141.

Therefore, when the leveling plate 141 supplies the powder on the supply plate 222 onto the build plate 212, as the lower surface of the leveling plate 141 heated comes into contact with the powder, the powder may be heated, that is, warmed.

The warmed powder reacts more quickly to the binder jetted from the nozzle head 135 and hardens more quickly. Accordingly, the time taken to perform 3D printing to manufacture an object may be shortened.

The main frame 100 is provided with the cleaning unit 700. The cleaning unit 700 is provided with a cleaning means, which will be described later.

In the middle of the main frame 100, an opening 150 corresponding to the box assembly 200 is provided.

The opening 150 is formed penetrating through the upper and the lower surface of the main frame 100.

As shown in FIGS. 1 and 2, the opening 150 may be divided into a building region 151, a powder supply region 152, and a withdrawal region 153.

The building region 151 is located behind the cleaning unit 700 of the main frame 100, and the build box 210 of the box assembly 200 is placed in the building region 151. The building region 151 is a region in which a 3D object is built through powder.

The powder supply region 152 is located behind the building region 151, and the powder supply box 220 of the box assembly 200 is placed in the powder supply region 152. The powder supply region 152 is a region in which powder is supplied.

The withdrawal region 153 is located ahead of the building region 151, to the left of the building region 151, and to the right of the building region 151, and a withdrawal box 230 of the box assembly 200 is placed in the withdrawal region 153. The withdrawal region 153 is a region in which surplus powder of the powder supplied to the building region 151 is withdrawn.

The withdrawal region 153 may be provided as multiple regions ahead of the building region 151, to the left of the building region 151, and to the right of the building region 151, respectively. The withdrawal regions 153 in the multiple regions may communicate with each other.

Unlike this, the withdrawal region 153 may be provided as multiple separate withdrawal regions 153 that do not communicate with each other. In this case, the multiple withdrawal regions 153 may be composed of multiple slits penetrating through the upper and the lower surface of the main frame 100.

The Box Assembly 200

Hereinafter, the box assembly 200 of the binder jetting 3D printer 10 of the present disclosure will be described with reference to FIGS. 1 to 4C.

Regarding the box assembly 200, the build box 210 in which the build plate 212 is provided and the powder supply box 220 in which the supply plate 222 is provided are integrated.

Specifically, as shown in FIGS. 1 to 4C, the box assembly 200 includes: the build box 210 in which a 3D object is built; the build plate 212 provided in the build box 210; the powder supply box 220 in which powder is supplied, the powder supply box 220 being provided behind the build box 210; the supply plate 222 provided in the powder supply box 220; and the withdrawal box 230 provided to surround the front of the build box 210, the left side of the build box 210, and the right side of the build box 210.

The build box 210 may include: a front surface, a rear surface, a left surface, and a right surface that define an inner space; and a build box upper plate 211 closing an upper part of the build box 210 except the inner space thereof.

A part of the upper part of the build box 210, that is, the inner space in the build box upper plate 211 is open.

A lower part of the build box 210 is open.

The front surface, the rear surface, the left surface, and the right surface of the build box 210 are formed protruding upward from the build box upper plate 211.

The build plate 212 is provided in the build box 210, and the build plate 212 closes the lower part of the build box 210, replacing the open lower part of the build box 210.

The build plate 212 is able to be lifted and lowered within the inner space in the build box 210 by the build plate lifting and lowering means 300.

When the box assembly 200 is placed in position, that is, the box assembly 200 is positioned under the opening 150 of the main frame 100, the build box 210 is positioned in the building region 151. Therefore, when the box assembly 200 is placed in position, the open upper part of the build box 210 is positioned in a region corresponding to the building region 151 of the opening 150.

A front surface, a rear surface, a left surface, and a right surface of the powder supply box 220 which define an inner space thereof are formed protruding upward from a withdrawal box upper plate 231 of the withdrawal box 230.

An upper part of the powder supply box 220, that is, the upper part of the inner space in the powder supply box 220, is open.

A lower part of the powder supply box 220 is open.

The supply plate 222 is provided in the powder supply box 220, and the supply plate 222 closes the lower part of the powder supply box 220, replacing the open lower part of the powder supply box 220.

The supply plate 222 is able to be lifted and lowered within the powder supply box 220 by the supply plate lifting and lowering means 400.

When the box assembly 200 is placed in position, that is, the box assembly 200 is positioned under the opening 150 of the main frame 100, the powder supply box 220 is positioned in the powder supply region 152. Therefore, when the box assembly 200 is placed in position, the open upper part of the powder supply box 220 is positioned in a region corresponding to the powder supply region 152 of the opening 150.

An upper part of the withdrawal box 230 is open.

The withdrawal box 230 may include a front withdrawal box provided ahead of the build box 210, a left withdrawal box provided to the left of the build box 210, and a right withdrawal box provided to the right of the build box 210. In this case, as shown in FIG. 3, the front withdrawal box, the left withdrawal box, and the right withdrawal box may have a structure in which the boxes communicate with each other.

When powder is supplied from the powder supply box 220 to the build box 210 by the leveling plate 141, surplus powder is withdrawn into the withdrawal box 230, whereby the withdrawal box 230 withdraws powder.

As described above, since the withdrawal box 230 is composed of the front withdrawal box, the left withdrawal box, and the right withdrawal box to surround the build box 210, the main frame 100 is prevented from becoming dirty because of dispersion of surplus powder over the main frame 100. Accordingly, powder is prevented from scattering, so that a work environment in performing a 3D printing process can be improved.

The Build Plate Lifting and Lowering Means 300

Hereinafter, the build plate lifting and lowering means 300 of the binder jetting 3D printer 10 of the present disclosure will be described with reference to FIGS. 1 to 6.

The build plate lifting and lowering means 300 lifts and lowers the build plate 212.

The build plate lifting and lowering means 300 is located under the building region 151 of the main frame 100 so as to be positioned under the build plate 212 of the box assembly 200 when the box assembly 200 is placed in position.

The build plate lifting and lowering means 300 may include: a first lifting and lowering plate 310 coupled to the build plate 212; a first post 320 connected to a lower part of the first lifting and lowering plate 310; and a first lifting and lowering plate driving part 330 lifting and lowering the first lifting and lowering plate 310 by lifting and lowering the first post 320.

As shown in FIG. 5, a protrusion 311 is provided in the center of an upper surface of the first lifting and lowering plate 310, and multiple alignment pins 312 are provided around the protrusion 311.

As shown in FIG. 6, in the center of a lower surface of the build plate 212, an insertion hole 213 into which the protrusion 311 is inserted is provided and multiple alignment holes 214 into which the multiple alignment pins 312 are inserted respectively are provided.

In a state in which the box assembly 200 is placed in position as shown in FIG. 4A, when the first lifting and lowering plate 310 is lifted by the first lifting and lowering plate driving part 330 and the first post 320 as shown in FIG. 4B, an upper part of the first lifting and lowering plate 310 is coupled to a lower part of the build plate 212.

When the first lifting and lowering plate 310 and the build plate 212 are coupled, the protrusion 311 of the first lifting and lowering plate 310 is inserted into the insertion hole 213 of the build plate 212 and the multiple alignment pins 312 of the first lifting and lowering plate 310 are inserted into the respective multiple alignment holes 241 of the build plate 212.

The protrusion 311 and the multiple alignment pins 312 facilitate the coupling and aligning of the first lifting and lowering plate 310 and the build plate 212.

As described above, as the first lifting and lowering plate 310 and the build plate 212 are coupled, when the first lifting and lowering plate 310 is lifted by operation of the first lifting and lowering plate driving part 330 as shown in FIG. 4C, the build plate 212 is also lifted with the first lifting and lowering plate 310.

The build plate 212 and the first lifting and lowering plate 310 of the build plate lifting and lowering means 300 may be coupled by magnetic force.

Specifically, a magnetic material 313 in which magnetic force is generated by the supply of electricity may be provided inside the protrusion 311, and the build plate 212 itself or the insertion hole 213 may be made of a metal material.

Therefore, in coupling the first lifting and lowering plate 310 and the build plate 212, when electricity is supplied, the first lifting and lowering plate 310 and the build plate 212 are coupled by the magnetic material with magnetic force.

As described above, as the first lifting and lowering plate 310 and the build plate 212 are coupled by magnetic force, when the first lifting and lowering plate 310 is lowered, the build plate 212 is also lowered with the first lifting and lowering plate 310.

Specifically, in the case in which the first lifting and lowering plate 310 and the build plate 212 are coupled by the protrusion 311 and the multiple alignment pins 312, when the first lifting and lowering plate 310 is lowered, the build plate 212 may not be properly lowered. This is because a sealing material is provided around a circumferential surface of the build plate 212 so that powder does not leak through the open lower part of the build box 210. Frictional force makes it difficult for the build plate 212 to be lowered by its own weight. However, as described above, when the first lifting and lowering plate 310 and the build plate 212 are coupled to each other by magnetic properties, as the first lifting and lowering plate 310 is lowered, the build plate 212 is also lowered.

In the above description, as an example, it has been described that the magnetic material 313, the protrusion 311, and the multiple alignment pins 312 are provided at the upper surface of the first lifting and lowering plate 310, and that the insertion hole 213 and the multiple alignment holes 214 are provided at the lower surface of the build plate 212, but a different configuration may be provided.

In other words, the protrusion 311 may be provided at either the upper surface of the first lifting and lowering plate 310 or the lower surface of the build plate 212, and the insertion hole 213 may be provided at the other between the upper surface of the first lifting and lowering plate 310 and the lower surface of the build plate 212.

In addition, the multiple alignment pins 312 may be provided at either the upper surface of the first lifting and lowering plate 310 or the lower surface of the build plate 212, and the multiple alignment holes 214 may be provided at the other between the upper surface of the first lifting and lowering plate 310 and the lower surface of the build plate 212.

In addition, the magnetic material 313 may be provided either at the upper surface of the first lifting and lowering plate 310 or inside the build plate 212. The upper surface of the first lifting and lowering plate 310 or the lower surface of the build plate 212 may be made of metal, wherein the one made of metal is not provided with the magnetic material 313.

That is, the build plate 212 and the first lifting and lowering plate 310 of the build plate lifting and lowering means 300 may be aligned by the alignment pin 312 provided at a first side and the alignment hole 214 provided at a second side and may be coupled to each other.

The Supply Plate Lifting and Lowering Means 400

Hereinafter, the supply plate lifting and lowering means 400 of the binder jetting 3D printer 10 of the present disclosure will be described with reference to FIGS. 1 to 6.

The supply plate lifting and lowering means 400 lifts and lowers the supply plate 222.

The supply plate lifting and lowering means 400 is located under the powder supply region 152 of the main frame 100 so as to be positioned under the supply plate 222 of the box assembly 200 when the box assembly 200 is placed in position.

The supply plate lifting and lowering means 400 may include: a second lifting and lowering plate 410 coupled to the supply plate 222; a second post 420 connected to a lower part of the second lifting and lowering plate 410; and a second lifting and lowering plate driving part 430 lifting and lowering the second lifting and lowering plate 410 by lifting and lowering the second post 420.

As shown in FIG. 5, a protrusion 411 is provided in the center of an upper surface of the second lifting and lowering plate 410, and multiple alignment pins 412 are provided around the protrusion 411.

As shown in FIG. 6, in the center of a lower surface of the supply plate 222, an insertion hole 223 into which the protrusion 411 is inserted is provided and multiple alignment holes 224 into which the multiple alignment pins 412 are inserted respectively are provided.

In a state in which the box assembly 200 is placed in position as shown in FIG. 4A, when the second lifting and lowering plate 410 is lifted by the second lifting and lowering plate driving part 430 and the second post 420 as shown in FIG. 4B, an upper part of the second lifting and lowering plate 410 is coupled to a lower part of the supply plate 222.

When the second lifting and lowering plate 410 and the supply plate 222 are coupled, the protrusion 411 of the second lifting and lowering plate 410 is inserted into the insertion hole 223 of the supply plate 222 and the multiple alignment pins 412 of the second lifting and lowering plate 410 are inserted into the respective multiple alignment holes 224 of the supply plate 222.

The protrusion 411 and the multiple alignment pins 412 facilitate the coupling and aligning of the second lifting and lowering plate 410 and the supply plate 222.

As described above, as the second lifting and lowering plate 410 and the supply plate 222 are coupled, when the second lifting and lowering plate 410 is lifted by operation of the second lifting and lowering plate driving part 430 as shown in FIG. 4C, the supply plate 222 is also lifted with the second lifting and lowering plate 410.

The supply plate 222 and the second lifting and lowering plate 410 of the supply plate lifting and lowering means 400 may be coupled by magnetic force.

Specifically, a magnetic material 413 in which magnetic force is generated by the supply of electricity may be provided inside the protrusion 411, and the supply plate 222 itself or the insertion hole 223 may be made of a metal material.

Therefore, in coupling the second lifting and lowering plate 410 and the supply plate 222, when electricity is supplied, the second lifting and lowering plate 410 and the supply plate 222 are coupled by the magnetic material with magnetic force.

As described above, as the second lifting and lowering plate 410 and the supply plate 222 are coupled by magnetic force, when the second lifting and lowering plate 410 is lowered, the supply plate 222 is also lowered with the second lifting and lowering plate 410.

Specifically, in the case in which the second lifting and lowering plate 410 and the supply plate 222 are coupled by the protrusion 411 and the multiple alignment pins 412, when the second lifting and lowering plate 410 is lowered, the supply plate 222 may not be properly lowered. This is because a sealing material is provided around a circumferential surface of the supply plate 222 so that powder does not leak through the open lower part of the powder supply box 220. Frictional force makes it difficult for the supply plate 222 to be lowered by its own weight. However, as described above, when the second lifting and lowering plate 410 and the supply plate 222 are coupled to each other by magnetic properties, as the second lifting and lowering plate 410 is lowered, the supply plate 222 is also lowered.

In the above description, as an example, it has been described that the magnetic material 413, the protrusion 411, and the multiple alignment pins 412 are provided at the upper surface of the second lifting and lowering plate 410, and that the insertion hole 223 and the multiple alignment holes 224 are provided at the lower surface of the supply plate 222, but a different configuration may be provided.

In other words, the protrusion 411 may be provided at either the upper surface of the second lifting and lowering plate 410 or the lower surface of the supply plate 222, and the insertion hole 223 may be provided on the other between the upper surface of the second lifting and lowering plate 410 and the lower surface of the supply plate 222.

In addition, the multiple alignment pins 412 may be provided at either the upper surface of the second lifting and lowering plate 410 or the lower surface of the supply plate 222, and the multiple alignment holes 224 may be provided at the other between the upper surface of the second lifting and lowering plate 410 and the lower surface of the supply plate 222.

In addition, the magnetic material 413 may be provided either at the upper surface of the second lifting and lowering plate 410 or inside the supply plate 222. The upper surface of the second lifting and lowering plate 410 or the lower surface of the supply plate 222 may be made of metal, wherein the one made of metal is not provided with the magnetic material 413.

That is, the supply plate 222 and the second lifting and lowering plate 410 of the supply plate lifting and lowering means 400 may be aligned by the alignment pin 412 provided at a first side and the alignment hole 224 provided at a second side and may be coupled to each other.

The Horizontal Movement Guide Means 500

Hereinafter, the horizontal movement guide means 500 will be described with reference to FIGS. 1, 7A, and 7B.

The horizontal movement guide means 500 is positioned below the main frame 100, and moves the box assembly 200 in a forward-backward direction.

The horizontal movement guide means 500 may be composed of a first chain rail 510 located to the lower left of the main frame 100 and a second chain rail 520 located to the lower right of the main frame 100.

The box assembly 200 is safely placed on the first and the second chain rail 510 and 520.

When the box assembly 200 is safely placed on the first and the second chain rail 510 and 520, the box assembly 200 is thus positioned between the main frame 100 and the first and the second chain rail 510 and 520.

The box assembly 200 is horizontally movable from the front of the binder jetting 3D printer 10 to the rear thereof by the rotation of the first and the second chain rail 510 and 520.

As shown in FIGS. 7A and 7B, the box assembly lifting and lowering means 530 lifts and lowers the horizontal movement guide means 500, that is, the first and the second chain rail 510 and 520, so that the box assembly 200 is lifted and lowered.

When the box assembly 200 is safely placed on the first and the second chain rail 510 and 520 and is moved from the front of the binder jetting 3D printer 10 to the rear thereof by the rotation of the chain rails, the first and the second chain rail 510 and 520 stay in a lowered state as shown in FIG. 7A.

In this case, the upper part of the box assembly 200 is at a distance from the lower surface of the main frame 100.

Since the lower surface of the main frame 100 is at a distance from the upper part of the box assembly 200, the box assembly 200 does not jam between the main frame 100 and the first and the second chain rail 510 and 520, thus achieving smooth horizontal movement of the box assembly 200 through the first and the second chain rail 510 and 520.

Afterward, when the box assembly 200 is placed in position, the box assembly lifting and lowering means 530 is operated so that the first and the second chain rail 510 and 520 are lifted as shown in FIG. 7B.

Accordingly, the box assembly 200 is also lifted with the first and the second chain rail 510 and 520.

When the box assembly 200 is lifted, the build box upper plate 211 of the build box 210 of the box assembly 200 comes into close contact with the lower surface of the main frame 100 and the front surface, the rear surface, the left surface, and the right surface of the build box 210 that protrude upward are inserted into the building region 151 of the opening 150.

In addition, when the box assembly 200 is lifted, the withdrawal box upper plate 231 of the withdrawal box 230 of the box assembly 200 comes into close contact with the lower surface of the main frame 100 and the front surface, the rear surface, the left surface, and the right surface of the powder supply box 220 that protrude upward are inserted into the powder supply region 152 of the opening 150.

As described above, as the front surface, the rear surface, the left surface, and the right surface of the powder supply box 220 that protrude upward are inserted into the powder supply region 152 of the opening 150, the gap between the main frame 100 and the powder supply box 220 is filled. Therefore, even when the supply plate 222 is lifted to supply powder, powder does not leak to the lower part of the main frame 100.

In addition, as the front surface, the rear surface, the left surface, and the right surface of the build box 210 that protrude upward are inserted into the building region 151 of the opening 150, the gaps between the main frame 100, the build box 210, and the withdrawal box 230 are filled. Therefore, even when powder is supplied from the powder supply box 220, powder is only withdrawn into the withdrawal box 230 or flows into the build box 210, but does not leak to the lower part of the main frame 100.

By such a configuration, when the box assembly 200 is moved horizontally through the first and the second chain rail 510 and 520 to withdraw the box assembly 200 and supply a new box assembly 200, the box assembly lifting and lowering means 530 lowers the first and the second chain rail 510 and 520 as shown in FIG. 7A. When a 3D printing process is performed, the box assembly lifting and lowering means 530 lifts the first and the second chain rail 510 and 520 as shown in FIG. 7B. Accordingly, the smooth horizontal movement of the box assembly 200 and the prevention of powder leakage to the gap between the main frame 100 and the box assembly 200 are achieved simultaneously.

The box assembly lifting and lowering means 530 may be a hydraulic cylinder or pneumatic cylinder for lifting or lowering the first and the second chain rail 510 and 520 by hydraulic or pneumatic pressure.

The Stopper 600

Hereinafter, the stopper 600 will be described.

The stopper 600 places the box assembly 200 in position when the box assembly 200 is moved from the rear of the binder jetting 3D printer 10 to the front thereof through the horizontal movement guide means, that is, the first and the second chain rail 510 and 520.

As shown in FIGS. 8A and 8B, the stopper 600 may include: a stopper body 610; a stopper lifting and lowering unit 620 lifting and lowering the stopper body 610; and a buffer 630 provided behind the stopper body 610 so as to be in contact with the front of the box assembly 200.

In order to perform a 3D printing process, when the box assembly 200 is moved from the rear to the front through the horizontal movement guide means, that is, the first and the second chain rail 510 and 520, the stopper body 610 of the stopper 600 stays lowered as shown in FIG. 8A.

Afterward, when the stopper lifting and lowering unit 620 lifts the stopper body 610, the front surface of the box assembly 200 comes into contact with the buffer provided behind the stopper body 610.

In this case, the stopper 600 is positioned below and ahead of the opening 150 of the main frame 100, so that the powder supply box 220 is positioned under the powder supply region 152 and the build box 210 is positioned under the building region 151, whereby the box assembly 200 stopped by the buffer 630 of the stopper 600 is placed in position.

In order to prevent damage to the box assembly 200, the buffer 630 may include: a roller 631 coming into close contact with the front surface of the box assembly 200; and an elastic part 632 applying elastic force to the roller. Therefore, when the box assembly 200 comes into contact with the roller 631, the roller 631 moves forward temporarily and moves back to the original position because of the elastic part 632, whereby impact due to the box assembly 200 may be lessened. Accordingly, the box assembly 200 and the stopper 600 may be prevented from being damaged.

As the stopper 600 having such a configuration is provided, the box assembly 200 is easily is placed in position when the box assembly 200 is horizontally moved. Accordingly, continuous printing by the 3D printing process of the binder jetting 3D printer 10 is smoothly performed.

The Cleaning Unit 700

Hereinafter, the cleaning unit 700 will be described.

As shown in FIGS. 9A to 9D, the main frame 100 is provided with the cleaning unit 700.

The cleaning unit 700 cleans the nozzle head 135 of the binder nozzle 130.

The cleaning unit 700 includes: a cleaning groove 710; and a cleaning means provided in the cleaning groove 710.

The cleaning groove 710 is located in the upper part of the main frame 100 and ahead of the building region 151 of the opening 150.

The cleaning groove 710 has an open upper part and a closed lower part, and is formed to be long left and right.

The cleaning groove 710 defines a cleaning region 154.

The cleaning means may include at least one of the following: a cleaning liquid spray nozzle (not shown) provided in the cleaning groove 710, and for spraying a cleaning liquid to a lower surface of the nozzle head 135 of the binder nozzle 130; a brush 720 for brushing the lower surface of the nozzle head 135; and an air nozzle (not shown) for spraying air to the lower surface of the nozzle head 135.

The cleaning liquid spray nozzle is for removing foreign matter, such as powder, at the lower surface of the nozzle head 135 through the spraying of the cleaning liquid.

The brush 720 removes foreign matter, such as powder, at the lower surface of the nozzle head 135 through physical contact between the brush 720 and the lower surface of the nozzle head 135.

The air nozzle is for removing foreign matter, such as powder, at the lower surface of the nozzle head 135 and drying the cleaning liquid simultaneously through the spraying of air.

FIGS. 9A to 9D show only the brush 720 as an example, but it is preferable that the cleaning means includes the brush 720, the air nozzle, and the cleaning liquid spray nozzle.

In addition, it is preferable that cleaning through the cleaning means is performed in the following order: the brush 720, the air nozzle, the cleaning liquid spray nozzle, the brush 720, and the air nozzle. This is because large foreign matter is removed through the brush 720, small foreign matter is removed through the air nozzle and the cleaning liquid, and the cleaning liquid is brushed and dried through the brush 720 and the air nozzle again.

Therefore, it is preferable that the cleaning means provided in the cleaning groove 710 includes the brush 720, the air nozzle, the cleaning liquid spray nozzle, the brush 720, and the air nozzle placed in that order, starting from the right of the binder jetting 3D printer 10 to the left thereof, and that the nozzle head 135 is moved for a cleaning process, starting from the right of the binder jetting 3D printer 10 to the left thereof.

Hereinafter, the cleaning process through the cleaning unit 700 will be described in detail with reference to FIGS. 9A to 9D.

Figure 9A:
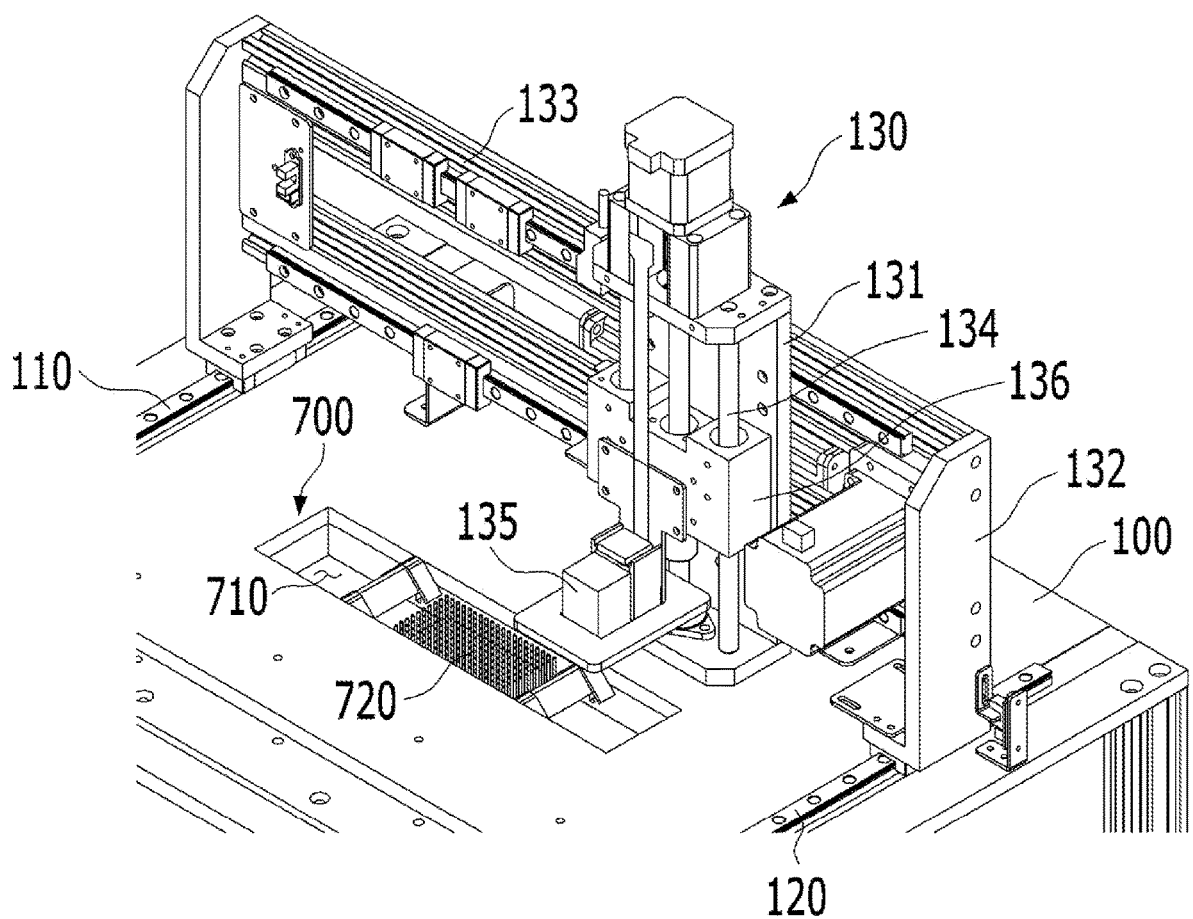
FIGS. 9A to 9D are perspective views illustrating a process of cleaning a binder nozzle through a cleaning means of a binder jetting 3D printer of the present disclosure.

For cleaning the binder nozzle 130, the binder nozzle 130 is moved forward by the nozzle moving means 132 and the nozzle body 131 is moved to the right along the first nozzle guide 133 as shown in FIG. 9A.

Figure 9B:
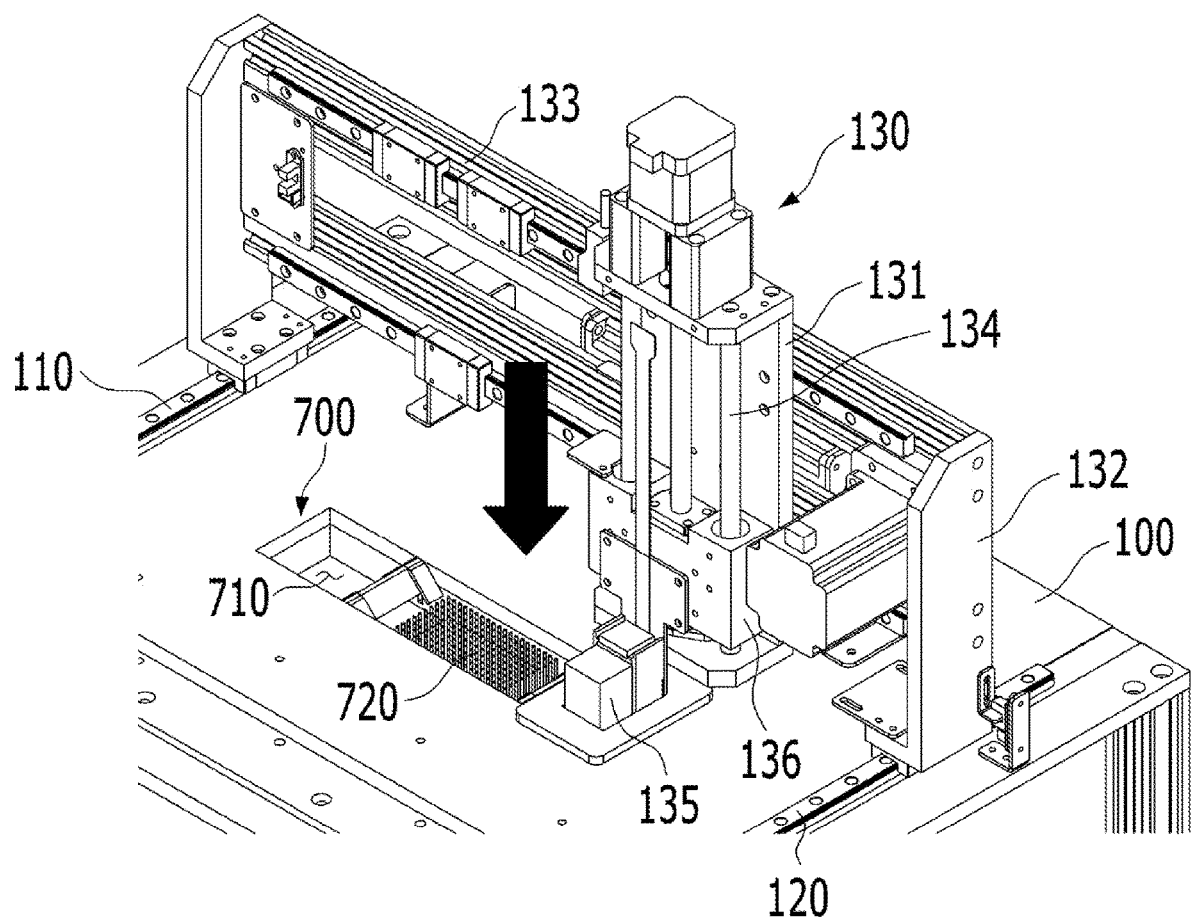

Afterward, as shown in FIG. 9B, the nozzle head 135 is lowered along the second nozzle guide 134 by the nozzle head lifting and lowering means 136 and enters the cleaning groove 710.

Figure 9C:
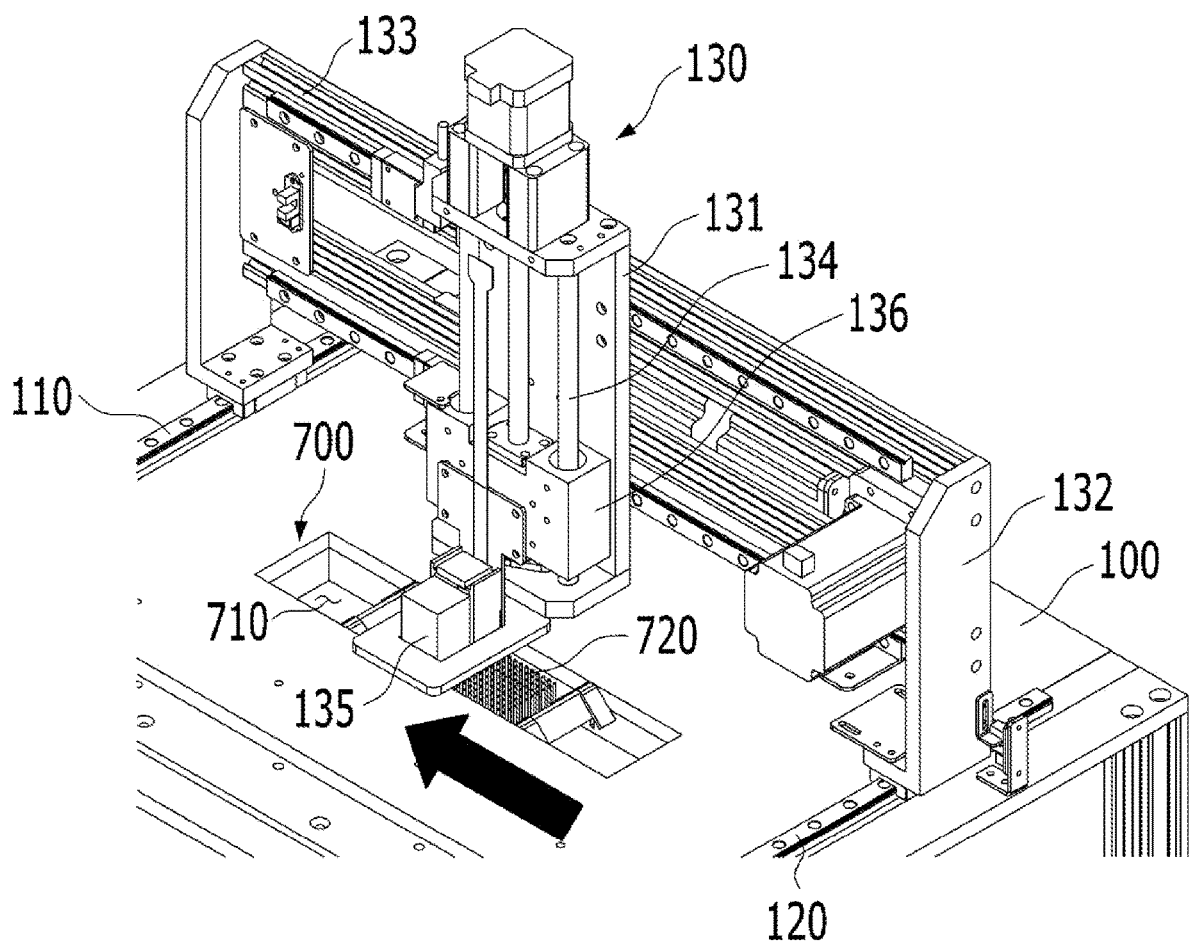

Afterward, as shown in FIG. 9C, the nozzle body 131 is moved to the left along the first nozzle guide 133, so that the lower surface of the nozzle head 135 is cleaned by the cleaning means, such as the brush 720.

Figure 9D:
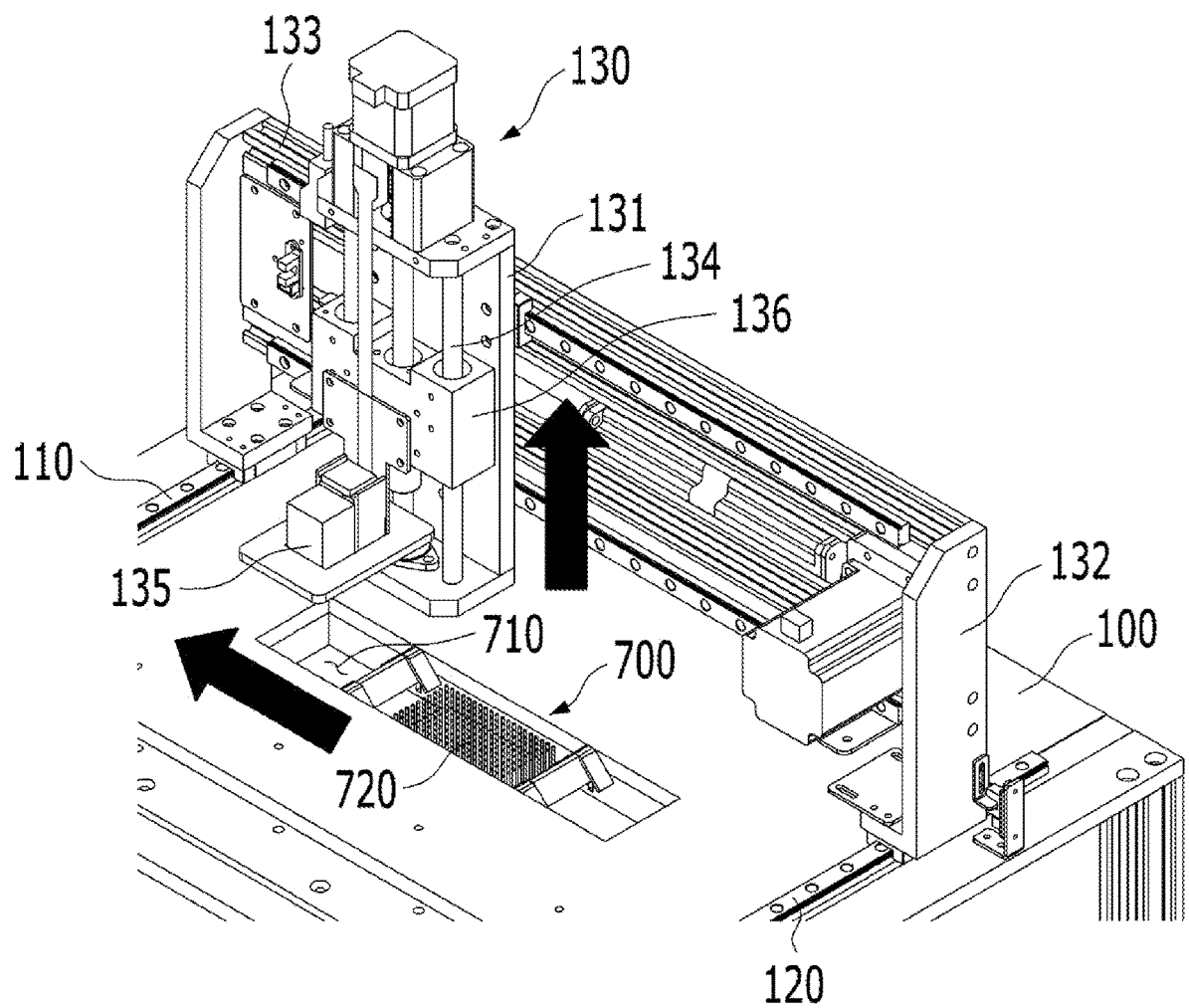

As shown in FIG. 9D, the nozzle body 131 is moved along the first nozzle guide 133 to the leftmost of the cleaning groove 710 and the cleaning of the lower surface of the nozzle head 135 is completed, and next, the nozzle head 135 is lifted along the second nozzle guide 134 by the nozzle head lifting and lowering means 136. As described above, as the nozzle head 135 is lifted, the cleaning process by the cleaning means is totally completed.

As described above, in the case of the binder jetting 3D printer 10 of the present disclosure, the nozzle head 135 is horizontally movable in a forward-backward direction and a left-right direction and is also vertically movable in an upward-downward direction, so that cleaning inside the cleaning groove 710 is easily performed.

As the cleaning of the nozzle head 135 is performed in the cleaning groove 710, the cleaning region 154 in which the cleaning of the nozzle head 135 is performed is provided as a separate space independent from the regions, such as the building region 151 and the powder supply region 152, in which the 3D printing process is performed.

Accordingly, the foreign matter at the lower surface of the nozzle head 135 and the cleaning liquid are fundamentally prevented from flowing into the powder supply box 220 or the build box 210, thus improving the reliability of the 3D printing process.

Although not shown in the drawings, the cleaning unit 700 may be provided with an upper plate for closing an upper part of the cleaning groove 710.

The upper plate may be provided with a head hole into which the nozzle head 135 is inserted. Accordingly, the upper plate closes the cleaning groove 710 open, that is, partially closes an upper part of the cleaning region 154 open.

The upper plate may be provided to be slidable in a left-right direction. Therefore, as the upper plate and the nozzle head 135 are moved together from the right to the left, the nozzle head 135 is movable along the cleaning groove 710 from the right to the left, with the nozzle head 135 inserted into the head hole.

In this case, a sealing material (not shown) may be provided on the side of the binder nozzle 130 or the side of the nozzle head 135.

The sealing material seals the gap between the nozzle head 135 and the head hole of the upper plate when the nozzle head 135 is inserted into the head hole. Therefore, when the nozzle head 135 is lowered, a lower surface of the sealing material comes into contact with an upper surface of the upper plate.

In other words, the binder nozzle 130 includes the sealing material provided on the side of the binder nozzle 130, the main frame 100 includes the cleaning region 154 open, and the binder nozzle 130 is lowered toward the cleaning region 154, and is then cleaned while the sealing material is in contact with the upper part of the cleaning region 154.

As described above, as the upper plate and the sealing material are provided, the cleaning region 154 and the outside of the cleaning region 154 are completely separated as separate and independent regions in the cleaning process. Therefore, foreign matter to be removed in the cleaning process may be effectively prevented from dispersing out of the cleaning region 154.

The 3D Printing Process Using the Binder Jetting 3D Printer 10 of the Present Disclosure Hereinafter, a 3D printing process using the binder jetting 3D printer 10 of the present disclosure will be described.

First, in order to perform the 3D printing process, being safely placed on the first and the second chain rail 510 and 520, the box assembly 200 is moved from the rear of the binder jetting 3D printer 10 to the front thereof.

Afterward, as shown in FIG. 8B, the roller 631 comes into close contact with the front surface of the box assembly 200 by the rising of the stopper body 610, and the box assembly 200 is placed in position.

After the box assembly 200 is placed in position, the first and the second chain rail 510 and 520 are lifted by the box assembly lifting and lowering means 530, so that the box assembly 200 itself is lifted as shown in FIG. 7B. Thus, the front surface, the rear surface, the left surface, and the right surface of the build box 210 that protrude upward are inserted into the building region 151 of the opening 150, and the front surface, the rear surface, the left surface, and the right surface of the powder supply box 220 that protrude upward are inserted into the powder supply region 152 of the opening 150.

After the box assembly 200 is lifted, the first lifting and lowering plate 310 and the second lifting and lowering plate 410 are lifted by the build plate lifting and lowering means 300 and the supply plate lifting and lowering means 400, respectively, and coupled to the build plate 212 and the supply plate 222, respectively, as shown in FIGS. 4A and 4B.

Afterward, the first lifting and lowering plate 310 is completely lifted and the build plate 212 is lifted to the uppermost part within the build box 210.

When the build plate 212 is lowered by the height of a powder layer by the first lifting and lowering plate 310, the second lifting and lowering plate 410 lifts the supply plate 222 and the powder leveling means 140 is moved from the rear to the front, so that the powder on the supply plate 222 is supplied onto the build plate 212 through the leveling plate 141. In this case, the powder supplied onto the build plate 212 becomes a powder layer that forms one layer on the build plate 212.

Afterward, through the nozzle head 135 of the binder nozzle 130, binder is jetted onto the powder layer on the build plate 212 according to the shape of an object. When the powder is made to adhere by the binder, the build plate 212 is lowered and the supply plate 222 is lifted so that supply of powder is performed again through the powder leveling means 140.

As described above, as the process of supplying powder and jetting binder is repeatedly performed, the building of a 3D object is completed.

Afterward, the first lifting and lowering plate 310 and the build plate 212 are separated from each other and the second lifting and lowering plate 410 and the supply plate 222 are separated from each other, and the stopper body 610 is lowered.

The box assembly 200 is moved forward by the first and the second chain rail 510 and 520 so that the object completed within the build box 210 is acquired.

Afterward, another box assembly 200 located behind the box assembly 200 from which the object is acquired is placed in position, and the above-described process is repeated, whereby continuous printing by the 3D printing process is achieved.

As described above, through the box assembly 200 including the powder supply box 220 and the build box 210 integrated with each other, the horizontal movement guide means 500, the build plate lifting and lowering means 300, and the supply plate lifting and lowering means 400, the binder jetting 3D printer 10 of the present disclosure is capable of performing a 3D printing process continuously and printing objects continuously.

The embodiments of the present disclosure have been provided to illustrate the present disclosure with reference to the accompanying drawings, it will be apparent to those skilled in the art that the embodiments are given by way of illustration only, and that various modifications and equivalent embodiments can be made without departing from the spirit and scope of the present disclosure. Accordingly, the true range of protection of the present disclosure should be determined by the technical spirit of the following claims.

What is claimed is:

1. A binder jetting 3D printer capable of continuous printing, the binder jetting 3D printer comprising:
   a main frame provided with a binder nozzle and a powder leveling means, and provided with a building region, a powder supply region, and a withdrawal region;
   a box assembly provided with a build box in which a build plate is provided, a powder supply box in which a supply plate is provided, and a withdrawal box provided to surround a front, a left side, and a right side of the build box;
   a build plate lifting and lowering means lifting and lowering the build plate;
   a supply plate lifting and lowering means lifting and lowering the supply plate;
   a horizontal movement guide means guiding horizontal movement of the box assembly, and comprising a first chain rail and a second chain rail; and
   a box assembly lifting and lowering means lifting and lowering the first chain rail, the second chain rail, and the box assembly, the box assembly being placed on the first chain rail and the second chain rail,
   wherein, when the box assembly is moved from a rear to a front of the binder jetting 3D printer, the horizontal movement guide means stays in a lowered state such that a gap between the main frame, the powder supply box, and the build box are maintained,
   wherein, when the box assembly is placed in position, the box assembly is lifted by the box assembly lifting and lowering means such that the gap between the main frame, the powder supply box, and the build box are closed,
   wherein the box assembly is supplied from the rear of the binder jetting 3D printer to an inside of the main frame by the horizontal movement guide means,
   wherein, when the box assembly is moved from the inside of the main frame to the front of the binder jetting 3D printer by the horizontal movement guide means, another box assembly located behind the box assembly is supplied from the rear of the binder jetting 3D printer to the inside of the main frame, and
   wherein each of the first chain rail and the second chain rail has first and second portions protruding from rear and front surfaces of the main frame to supply the box assembly from the rear of the binder jetting 3D printer to the inside of the main frame and to move the box assembly from the inside of the main frame to the front of the binder jetting 3D printer, respectively.

2. The binder jetting 3D printer of claim 1, wherein the build plate and the build plate lifting and lowering means, or the supply plate and the supply plate lifting and lowering means are aligned by an alignment pin provided at a first side and an alignment hole provided at a second side.

3. The binder jetting 3D printer of claim 1, wherein the build plate and the build plate lifting and lowering means, or the supply plate and the supply plate lifting and lowering means are coupled to each other by magnetic force.

4. The binder jetting 3D printer of claim 1, wherein a plurality of the withdrawal regions are provided in the withdrawal box and communicate spatially with each other.

5. The binder jetting 3D printer of claim 1, further comprising a cleaning means.

6. The binder jetting 3D printer of claim 5, wherein the cleaning means comprises at least one of the following:
   a cleaning liquid spray nozzle for spraying a cleaning liquid to a lower surface of a nozzle head of the binder nozzle;
   a brush for brushing the lower surface of the nozzle head; and
   an air nozzle for spraying air to the lower surface of the nozzle head.

7. The binder jetting 3D printer of claim 1, wherein the binder nozzle has a side on which a sealing material is provided, and the main frame is provided with a cleaning region open,
   wherein the binder nozzle is lowered toward the cleaning region, and while the sealing material is in contact with an upper part of the cleaning region, the binder nozzle is cleaned.

8. The binder jetting 3D printer of claim 1, wherein the box assembly lifting and lowering means lifts the first chain rail, the second chain rail, and the entirety of the box assembly in a first direction, and lowers the first chain rail, the second chain rail, and the entirety of the box assembly in a second direction opposite to the first direction.

9. The binder jetting 3D printer of claim 1, wherein the horizontal movement guide means moves the box assembly from the rear of the binder jetting 3D printer to the inside of the main frame in a specific direction, and moves the box assembly from the inside of the main frame to the front of the binder jetting 3D printer in the specific direction.

* * * * *